(12) United States Patent
Masuda et al.

(10) Patent No.: US 11,597,466 B2
(45) Date of Patent: Mar. 7, 2023

(54) OPERATING DEVICE FOR HUMAN-POWERED VEHICLE

(71) Applicant: SHIMANO INC., Sakai (JP)

(72) Inventors: Takaya Masuda, Sakai (JP); Fumihide Numata, Sakai (JP); Yoshiyuki Kasai, Sakai (JP); Tomohiro Takimoto, Sakai (JP); Nobuhiro Kure, Sakai (JP); Katsuhiro Tachibana, Sakai (JP); Hiroshi Tsuda, Sakai (JP); Yasuyuki Komada, Sakai (JP); Shun Kakehashi, Sakai (JP); Yuichiro Hidaka, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 16/950,829

(22) Filed: Nov. 17, 2020

(65) Prior Publication Data
US 2022/0063754 A1 Mar. 3, 2022

Related U.S. Application Data

(63) Continuation-in-part of application No. 17/003,948, filed on Aug. 26, 2020, now abandoned.

(51) Int. Cl.
*B60T 7/08* (2006.01)
*B62K 23/06* (2006.01)
(Continued)

(52) U.S. Cl.
CPC .............. *B62K 23/02* (2013.01); *B60L 3/02* (2013.01); *B60T 7/085* (2013.01); *B60T 7/102* (2013.01); *B62K 23/06* (2013.01); *G05G 1/04* (2013.01)

(58) Field of Classification Search
CPC .......... B62K 23/02; B62K 23/06; G05G 1/04; B62L 3/023
See application file for complete search history.

(56) References Cited

U.S. PATENT DOCUMENTS

| 6,073,730 A | 6/2000 | Abe |
| 7,760,078 B2 | 7/2010 | Miki et al. |

(Continued)

FOREIGN PATENT DOCUMENTS

| CN | 1202437 | 12/1998 |
| CN | 107010156 | 8/2017 |

(Continued)

OTHER PUBLICATIONS

Define electrical contact, Google Search, May 7, 2021 (Year: 2021).*

(Continued)

*Primary Examiner* — Vinh Luong
(74) *Attorney, Agent, or Firm* — Mori & Ward, LLP

(57) ABSTRACT

An operating device for a human-powered vehicle comprises a base member, an operating member, an accommodating structure, and a second electric power source. The operating member is movably coupled to the base member. The accommodating structure is configured to accommodate a first electric power source. The second electric power source is electrically connected so as to supply electricity to a wireless communicator. The second electric power source is separate from the first electric power source.

24 Claims, 11 Drawing Sheets

(51) Int. Cl.
*B62L 3/02* (2006.01)
*B62K 23/02* (2006.01)
*G05G 1/04* (2006.01)
*B60T 7/10* (2006.01)
*B60L 3/02* (2006.01)

(56) References Cited

U.S. PATENT DOCUMENTS

| | | | |
|---|---|---|---|
| 9,434,437 B2 | 9/2016 | Van Dyke et al. | |
| 10,486,658 B2 | 11/2019 | Komatsu et al. | |
| 11,425,472 B2* | 8/2022 | Komada et al. | H04Q 9/00 |
| 11,472,510 B2* | 10/2022 | Komada et al. | B62L 3/023 |
| 2003/0032327 A1 | 2/2003 | LaBonte | |
| 2008/0210046 A1 | 9/2008 | De Perini | |
| 2009/0315692 A1* | 12/2009 | Miki | B62K 23/02 340/432 |
| 2012/0096978 A1 | 4/2012 | Voshell et al. | |
| 2014/0102237 A1* | 4/2014 | Jordan | B62J 99/00 74/473.12 |
| 2016/0311499 A1 | 10/2016 | Kasai | |
| 2017/0080993 A1 | 3/2017 | Bierwerth et al. | |
| 2017/0305395 A1* | 10/2017 | Komatsu | B62K 23/06 |
| 2017/0305490 A1 | 10/2017 | Komatsu et al. | |
| 2018/0001960 A1 | 1/2018 | Pasqua | |
| 2018/0057102 A1 | 3/2018 | Komatsu | |
| 2018/0057103 A1* | 3/2018 | Komatsu | B62K 23/06 |
| 2018/0057104 A1* | 3/2018 | Komatsu | B62K 23/06 |
| 2019/0002057 A1 | 1/2019 | Jordan et al. | |
| 2019/0351965 A1* | 11/2019 | Syouge | H01R 11/11 |
| 2019/0382074 A1 | 12/2019 | Bierwerth et al. | |
| 2019/0382081 A1 | 12/2019 | Bierwerth et al. | |
| 2020/0010143 A1* | 1/2020 | Kao | B62J 45/00 |
| 2021/0139102 A1 | 5/2021 | Komada et al. | |
| 2021/0144453 A1 | 5/2021 | Komada et al. | |
| 2021/0323636 A1* | 10/2021 | Cahan | B62L 3/023 |

FOREIGN PATENT DOCUMENTS

| | | |
|---|---|---|
| CN | 107303929 | 10/2017 |
| CN | 107303934 | 10/2017 |
| CN | 107776814 | 3/2018 |
| DE | 102016010801 | 3/2017 |
| DE | 10 2018 009 621 | 7/2019 |
| DE | 10 2019 004 154 | 12/2019 |
| TW | I667169 B | 8/2019 |

OTHER PUBLICATIONS

Lithium-ion battery, Google Search, Oct. 22, 2021 (Year: 2021).*
Lithium manganese dioxide battery, Google Search, Oct. 22, 2021 (Year: 2021).*
What are primary batteris? UPS Battery, upsbatterycenter.com, 2018 (Year: 2018).*
Primary Battery vs Secondary Battery / Difference between Primary Battery and Secondary Battery, RF Wireless World, 2012 (Year: 2012).*
What kind of batteries exist? Visblue A/S 2020 (Year: 2020).*
Office Action with Form PTO-892 Notice of References Cited issued by the United States Patent and Trademark Office for the co-pending U.S. Appl. No. 16/864,165, dated May 14, 2021.
Office Action with Form PTO-892 Notice of References Cited issued by the United States Patent and Trademark Office for the co-pending U.S. Appl. No. 16/683,212, dated Feb. 8, 2021.
Office Action with Form PTO-892 Notice of References Cited issued by the United States Patent and Trademark Office for the co-pending U.S. Appl. No. 16/683,212, dated Jul. 15, 2021.
Office Action with Form PTO-892 Notice of References Cited issued by the United States Patent and Trademark Office for the co-pending U.S. Appl. No. 16/864,165, dated Nov. 9, 2021.
Office Action with Form PTO-692 Notice of References Cited Issued by the United States Patent and Trademark Office for the co-pending U.S. Appl. No. 16/683,200, dated Dec. 9, 2021.
Define plane, Google Search, Nov. 17, 2021.
Definition of plane, merriam-webstemom, Nov. 16, 2021.
Definition of area, merriam-webstemom, Nov. 16, 2021.
Define reference plane, Google Search, Nov. 16, 2021.
Office Action with Form PTO-892 Notice of References Cited issued by the United States Patent and Trademark Office for the co-pending U.S. Appl. No. 16/683,206, dated Nov. 22, 2021.
Advisory Action issued by the United States Patent and Trademark Office for the co-pending U.S. Appl. No. 16/864,165, dated Feb. 4, 2022.
Office Action issued by the United States Patent and Trademark Office for the co-pending U.S. Appl. No. 16/864,165, dated Feb. 15, 2022.
Office Action with Form PTO-892 Notice of References Cited issued by the United States Patent and Trademark Office for the co-pending U.S. Appl. No. 16/683,212, dated Feb. 9, 2022.
Office Action issued by the United States Patent and Trademark Office for the co-pending U.S. Appl. No. 16/683,200, dated Apr. 14, 2022.
"Vuka Shift AXS User Manual", SRAM, LLC., 2020.

* cited by examiner

OPERATING DEVICE FOR HUMAN-POWERED VEHICLE

CROSS-REFERENCE TO RELATED APPLICATIONS

The present application is a continuation-in-part application of the U.S. patent application Ser. No. 17/003,948 filed Aug. 26, 2020. The contents of this application are incorporated herein by reference in their entirety.

BACKGROUND OF THE INVENTION

Field of the Invention

The present invention relates to an operating device for a human-powered vehicle.

Discussion of the Background

A human-powered vehicle includes an operating unit configured to operate an operated unit.

SUMMARY OF THE INVENTION

In accordance with a first aspect of the present invention, an operating device for a human-powered vehicle comprises a base member, an operating member, an accommodating structure, and a second electric power source. The operating member is movably coupled to the base member. The accommodating structure is configured to accommodate a first electric power source. The second electric power source is electrically connected so as to supply electricity to a wireless communicator. The second electric power source is separate from the first electric power source.

With the operating device according to the first aspect, it is possible to stably supply electricity to the wireless communicator using the second electric power source.

In accordance with a second aspect of the present invention, the operating device according to the twelfth aspect is configured so that the second electric power source is provided to the base member.

With the operating device according to the second aspect, it is possible to utilize the base member as a portion to which the second electric power source is provided.

In accordance with a third aspect of the present invention, the operating device according to the first or second aspect is configured so that the accommodating structure includes an electrical contact configured to be in contact with the first electric power source in an accommodation state where the accommodating structure accommodates the first power source. The second electric power source is configured to be electrically connected to the electrical contact.

With the operating device according to the third aspect, it is possible to electrically connect the first electric power source to the second electric power source in a state where the first electric power source is accommodated by the accommodating structure.

In accordance with a fourth aspect of the present invention, the operating device according to the third aspect is configured so that the electrical contact is configured to connect the first electric power source and the second electric power source in parallel.

With the operating device according to the fourth aspect, it is possible to supply electricity from one of the first electric power source and the second electric power source to an electric component without using the other of the first electric power source and the second electric power source.

In accordance with a fifth aspect of the present invention, the operating device according to the third or fourth aspect is configured so that the electrical contact includes a positive contact, and a negative contact separated from the positive contact. The second electric power source is configured to be electrically connected to the positive contact and the negative contact.

With the operating device according to the fifth aspect, it is possible to electrically connect the first electric power source to the second electric power source in a state where the first electric power source is accommodated by the accommodating structure.

In accordance with a sixth aspect of the present invention, the operating device according to any one of the first to fifth aspects is configured so that the first electric power source includes a primary battery. The second electric power source includes a secondary battery.

With the operating device according to the sixth aspect, it is possible to utilize the characteristics of the primary battery and the secondary battery.

In accordance with a seventh aspect of the present invention, the operating device according to any one of the first to sixth aspects further comprises a first substrate extending along a first reference plane. The second electric power source is electrically connected to the first substrate.

With the operating device according to the seventh aspect, it is possible to electrically connect the second electric power source to other electric components through the first substrate.

In accordance with an eighth aspect of the present invention, the operating device according to the seventh aspect is configured so that the second electric power source is electrically mounted on the first substrate.

With the operating device according to the eighth aspect, it is possible to omit an intermediate wire between the second electric power source and the first substrate.

In accordance with a ninth aspect of the present invention, the operating device according to the seventh or eighth aspect is configured so that the first reference plane defines a first area and a second area provided on a reverse side of the first area with respect to the first reference plane. The accommodating structure is provided in one of the first area and the second area. The second electric power source is provided in the other of the first area and the second area.

With the operating device according to the ninth aspect, it is possible to efficiently utilize a space around the first substrate as a space in which the accommodating structure and the second electric power source.

In accordance with a tenth aspect of the present invention, the operating device according to any one of the seventh to ninth aspects is configured so that the first substrate is provided between the accommodating structure and the second electric power source.

With the operating device according to the tenth aspect, it is possible to efficiently utilize an area between the accommodating structure and the second electric power source.

In accordance with an eleventh aspect of the present invention, the operating device according to any one of the first to tenth aspects is configured so that the base member extends in a longitudinal direction and includes a first end portion configured to be coupled to a handlebar and a second end portion opposite to the first end portion in the longitudinal direction. At least one of the accommodating structure and the second electric power source is provided to the second end portion.

With the operating device according to the eleventh aspect, it is possible to utilize the second end portion as a portion in which at least one of the accommodating structure and the second electric power source is provided.

In accordance with a twelfth aspect of the present invention, the operating device according to any one of the first to eleventh aspects further comprises a controller configured control an electric supply from at least one of the first electric power source and the second electric power source based on information relating to at least one of the first electric power source and the second electric power source.

With the operating device according to the twelfth aspect, it is possible to control the electric supply from at least one of the first electric power source and the second electric power source depending on a state of at least one of the first electric power source and the second electric power source.

In accordance with a thirteenth aspect of the present invention, the operating device according to the twelfth aspect is configured so that the information includes a first electrical state of the first electric power source and a second electrical state of the second electric power source. The controller is configured to control the electric supply from at least one of the first electric power source and the second electric power source based on at least one of the first electrical state and the second electrical state.

With the operating device according to the thirteenth aspect, it is possible to properly control the electric supply from at least one of the first electric power source and the second electric power source depending on the electrical states of the first electric power source and the second electric power source.

In accordance with a fourteenth aspect of the present invention, the operating device according to the thirteenth aspect is configured so that the controller is configured to start to charge the second electric power source using electricity stored in the first electric power source if the first electrical state meets a first charging-start condition and/or if the second electrical state meets a second charging-start condition.

With the operating device according to the fourteenth aspect, it is possible to properly control the start of charging the second electric power source using at least one of the first charging-start condition and the second charging-start condition.

In accordance with a fifteenth aspect of the present invention, the operating device according to the thirteenth or fourteenth aspect is configured so that the controller is configured to stop charging the second electric power source if the first electrical state meets a first charging-stop condition and/or if the second electrical state meets a second charging-stop condition.

With the operating device according to the fifteenth aspect, it is possible to properly control the stop of charging the second electric power source using at least one of the first charging-stop condition and the second charging-stop condition.

In accordance with a sixteenth aspect of the present invention, the operating device according to any one of the thirteenth to fifteenth aspects is configured so that the controller is configured to start to supply electricity from the second electric power source to an electric component if the first electrical state meets a first supplying-start condition and/or if the second electrical state meets a second supplying-start condition.

With the operating device according to the sixteenth aspect, it is possible to properly control the start of supplying electricity using at least one of the first supplying-start condition and the second supplying-start condition.

In accordance with a seventeenth aspect of the present invention, the operating device according to any one of the thirteenth to sixteenth aspects is configured so that the controller is configured to stop supplying electricity from the second electric power source to the electric component if the first electrical state meets a first supplying-stop condition and/or if the second electrical state meets a second supplying-stop condition.

With the operating device according to the seventeenth aspect, it is possible to properly control the stop of supplying electricity using at least one of the first supplying-stop condition and the second supplying-stop condition.

In accordance with an eighteenth aspect of the present invention, the operating device according to any one of the thirteenth to seventeenth aspects is configured so that the first electrical state includes at least one of a first output voltage of the first electric power source, a first output current of the first electric power source, and a first remaining level of the first electric power source. The second electrical state includes at least one of a second output voltage of the second electric power source, a second output current of the second electric power source, and a second remaining level of the second electric power source.

With the operating device according to the eighteenth aspect, it is possible to properly control the electric supply based on at least one of the first electrical state and the second electrical state.

In accordance with a nineteenth aspect of the present invention, the operating device according to any one of the twelfth to eighteenth aspects further comprises a detector configured to detect the information.

With the operating device according to the nineteenth aspect, it is possible to more properly control the electric supply based on the information detected by the detector.

In accordance with a twentieth aspect of the present invention, the operating device according to the nineteenth aspect is configured so that the controller includes a memory connected to the detector so as to store the information detected by the detector.

With the operating device according to the twentieth aspect, it is possible to utilize the information stored in the memory in order to control the electric supply.

In accordance with a twenty-first aspect of the present invention, the operating device according to any one of the twelfth to twentieth aspects further comprises an informing unit configured to inform a user of the information.

With the operating device according to the twenty-first aspect, it is possible to let the user know the information relating to at least one of the first electric power source and the second electric power source

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
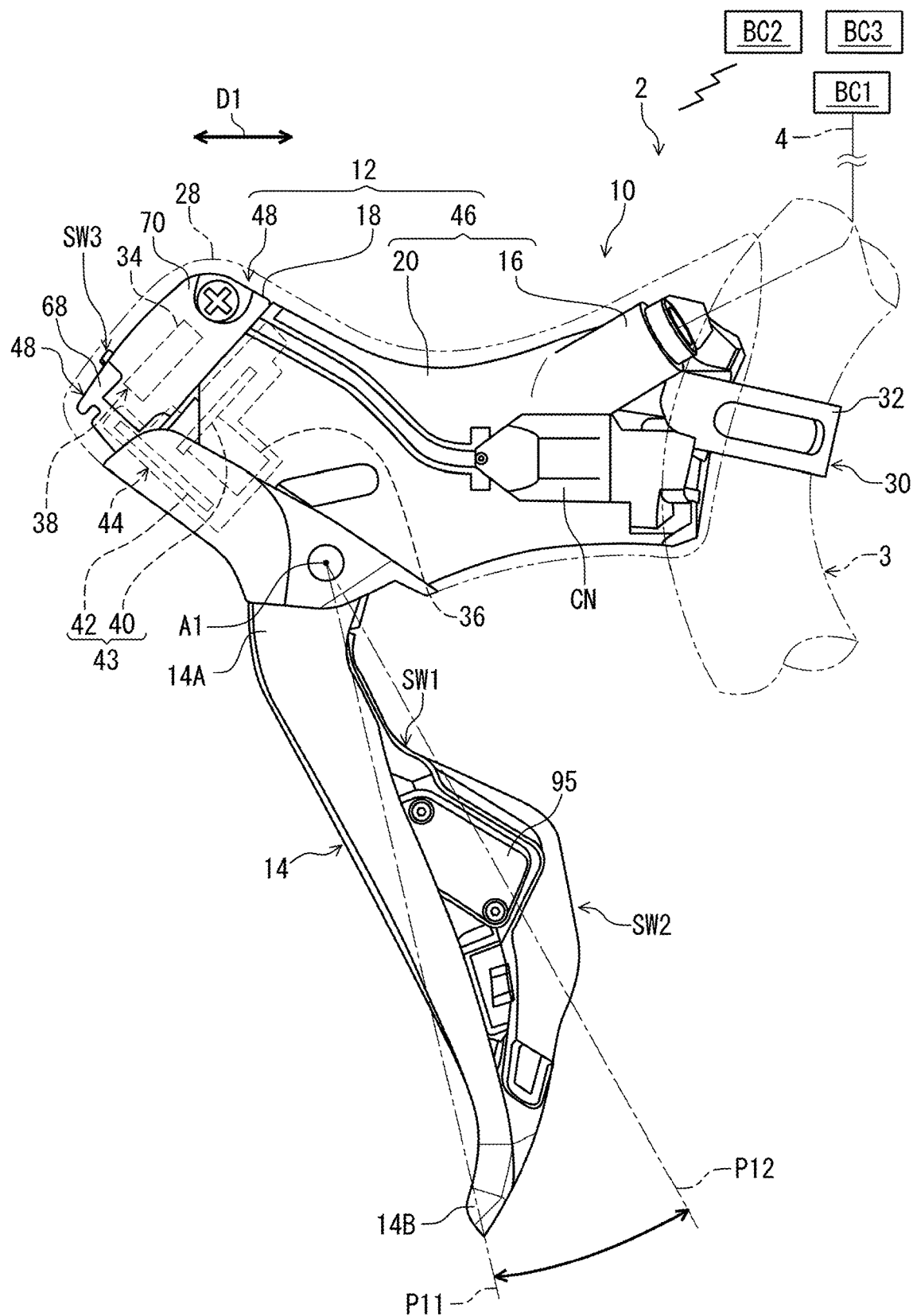
FIG. 1 is a side elevational view of an operating device in accordance with an embodiment.

The embodiment(s) will now be described with reference to the accompanying drawings, wherein like reference numerals designate corresponding or identical elements throughout the various drawings.

As seen in FIG. 1, an operating device 10 for a human-powered vehicle 2 is configured to be mounted to a handlebar 3. In the present embodiment, the operating device 10 is configured to be mounted to a drop-down handlebar. However, structures of the operating device 10 can be applied to other operating devices mounted to other type of handlebars such as a flat handlebar, a time trial handlebar, and a bull horn handlebar. The operating device 10 can be mounted to other portions in the human-powered vehicle 2.

For example, the human-powered vehicle 2 is a vehicle to travel with a motive power including at least a human power of a user who rides the human-powered vehicle 2 (i.e., rider). The human-powered vehicle 2 has an arbitrary number of wheels. For example, the human-powered vehicle 2 has at least one wheel. In the present embodiment, the human-powered vehicle 2 preferably has a smaller size than that of a four-wheeled automobile. However, the human-powered vehicle 2 can have an arbitrary size. For example, the human-powered vehicle 2 can have a larger size than that of the four-wheeled automobile. Examples of the human-powered vehicle 2 include a bicycle, a tricycle, and a kick scooter. In the present embodiment, the human-powered vehicle 2 is a bicycle. An electric assisting system including an electric motor can be applied to the human-powered vehicle 2 (e.g., the bicycle) to assist muscular motive power of the user. Namely, the human-powered vehicle 2 can be an E-bike.

The operating device 10 is operatively coupled to at least one device to operate the at least one device. In the present embodiment, the operating device 10 is operatively coupled to an operated device BC1 such as a brake device. The operating device 10 is operatively coupled to the operated device BC1 via a hydraulic hose 4. However, the operating device 10 can be operatively coupled to a mechanical component such as a brake device via a mechanical control cable including an inner wire. The operated device BC1 can include devices other than a brake device.

The operating device 10 is electrically connected to an electric device BC2 and an additional electric device BC3. In the present embodiment, the operating device 10 is wirelessly connected to the electric device BC2 and the additional electric device BC3. However, the operating device 10 is connected to the electric device BC2 and the additional electric device BC3 via an electrical control cable.

Examples of the electric device BC2 and the additional electric device BC3 include an additional or satellite operating device, an adjustable seatpost, a suspension, a gear changing device, a brake device, a lighting device, and a display device. In the present embodiment, the electric device BC2 includes a gear shifting device such as a derailleur. The additional electric device BC3 includes an adjustable seatpost. However, the electric device BC2 and the additional electric device BC3 are not limited to the above devices.

In the present embodiment, the operating device 10 is a right-hand side operating/control device configured to be operated by the rider's right hand to actuate the operated device BC1. However, the structures of the operating device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or seat) in the human-powered vehicle 2 with facing the handlebar 3. Accordingly, these terms, as utilized to describe the operating device 10 or other components, should be interpreted relative to the human-powered vehicle 2 equipped with the operating device 10 as used in an upright riding position on a horizontal surface.

The operating device 10 comprises switches SW1, SW2, and SW3. The switch SW1 is configured to be activated in response to a user input. The switch SW2 is configured to be activated in response to a user input. The switch SW3 is configured to be activated in response to a user input. In the present embodiment, the electric device BC2 is configured to be operated in response to the user inputs of the switches SW1 and SW2. The additional electric device BC3 is configured to be operated in response to the user input of the switch SW3. For example, the electric device BC2 is configured to upshift and downshift in response to the user inputs received by the switches SW1 and SW2. The additional electric device BC3 is configured to change a state of the additional electric device BC3 between a lock state and an adjustable state in response to the user input received by the switch SW3. However, each of the switches SW1 to SW3 can be used to operate other devices.

As seen in FIG. 1, the operating device 10 for the human-powered vehicle 2 comprises a base member 12 and an operating member 14. The base member 12 extends in a longitudinal direction D1. The base member 12 includes a first end portion 16 and a second end portion 18. The first end portion 16 is configured to be coupled to the handlebar. The second end portion 18 is opposite to the first end portion 16 in the longitudinal direction D1. The second end portion 18 constitutes a free end portion of the base member 12. The base member 12 includes a grip portion 20 provided between the first end portion 16 and the second end portion 18. The grip portion 20 is provided between the first end portion 16 and the second end portion 18 in the longitudinal direction D1.

The operating member 14 is movably coupled to the base member 12. The operating member 14 is pivotally coupled to the base member 12 about a pivot axis A1. The pivot axis A1 is provided closer to the second end portion 18 than to the first end portion 16. The operating member 14 includes a proximal end portion 14A and a distal end portion 14B opposite to the proximal end portion 14A. The operating member 14 extends from the proximal end portion 14A to the distal end portion 14B. The proximal end portion 14A is closer to the pivot axis A1 than the distal end portion 14B. The distal end portion 14B is farther from the proximal end portion 14A than the pivot axis A1 in a longitudinal direction D1 of the operating member 14. In the present embodiment, the distal end portion 14B is the farthest from the proximal end portion 14A in the operating member 14 and constitutes a free end portion of the operating member 14. The distal end portion 14B is provided below the pivot axis A1 and the proximal end portion 14A in a mounting state where the first end portion 16 is coupled to the handlebar 3.

The operating member 14 is pivotable relative to the base member 12 between a rest position P11 and an operated position P12 about the pivot axis A1. The operating device 10 includes a pivot shaft 24 defining the pivot axis A1. The pivot shaft 24 pivotally couples the operating member 14 to the base member 12. In the present embodiment, the rest position P11 and the operated position P12 are defined by the pivot axis A1 and the distal end portion 14B.

In the present application, the term "rest position" as used herein refers to a position at which a movable part such as the operating member 14 remains stationary in a state where the movable part is not operated by the user. The term "operated position" as used herein refers to a position at which the movable part has been operated by the user to perform the operation of a device such as the operated device BC1.

The base member 12 includes a hydraulic unit 26 provided in the base member 12. The hydraulic unit 26 is configured to generate hydraulic pressure in response to a movement of the operating member 14. For example, the hydraulic unit 26 includes a cylinder bore, a piston, and a reservoir. Since the hydraulic unit 26 includes structures which have been known, they will not be described in detail here for the sake of brevity. The operating member 14 can be operatively coupled to another structure instead of the hydraulic unit 26. For example, the operating member 14 can be operatively coupled to a mechanical control cable such as a Bowden cable so as to operate the operated device BC1.

The operating device 10 further comprises a grip cover 28. The grip cover 28 is configured to be attached to the base member 12 so as to at least partly cover the base member 12 in a state where the grip cover 28 is attached to the base member 12. For example, the grip cover 28 is made of a non-metallic material such as an elastic material. Examples of the elastic material include rubber. A rider sometimes grips the base member 12 (e.g., the grip portion 20) and leans on the base member 12 (e.g., the grip portion 20) through the grip cover 28 during riding. The grip cover 28 can be omitted from the operating device 10.

The switches SW1 and SW2 are mounted to the operating member 14 to be movable relative to the base member 12 along with the operating member 14. The switch SW3 is mounted to the base member 12. The switch SW3 is provided to the second end portion 18. The switch SW3 is provided between the base member 12 and the grip cover 28. The switch SW3 is configured to be operated by the user via the grip cover 28. However, the positions of the switches SW1, SW2, and SW3 are not limited to this embodiment.

The operating device 10 further comprises a mounting structure 30 configured to couple the first end portion 16 to the handlebar 3. The mounting structure 30 preferably includes a band clamp 32 and a tightening member (not shown). The mounting structure 30 can include other structures which is similar to the band clamp 32 and which is used in a road shifter for mounting to a drop-down handlebar.

As seen in FIG. 1, the operating device 10 comprises a first electric power source 34. In the present embodiment, for example, the first electric power source 34 includes a primary battery. The first electric power source 34 is configured not to be rechargeable. The primary battery includes a button cell shaped as a flat cylinder. However, the first electric power source 34 is not limited to the primary battery.

The operating device 10 for the human-powered vehicle 2 comprises a second electric power source 36. The second electric power source 36 is separate from the first electric power source 34. Examples of the second electric power source 36 include a secondary battery and a capacitor. In the present embodiment, the second electric power source 36 includes a secondary battery. The second electric power source 36 is configured to be rechargeable using electric power. However, the second electric power source 36 is not limited to the secondary battery.

The first electric power source 34 is provided to one of the base member 12 and the operating member 14. The second electric power source 36 is provided to one of the base member 12 and the operating member 14. At least one of the accommodating structure 38 and the second electric power source 36 is provided to the second end portion 18. In the present embodiment, the first electric power source 34 is provided to the base member 12.

The second electric power source 36 is provided to the base member 12. The accommodating structure 38 and the second electric power source 36 are provided to the second end portion 18. However, the first electric power source 34 can be provided to the operating member 14. The second electric power source 36 can be provided to the operating member 14. At least one of the accommodating structure 38 and the second electric power source 36 can be provided to other portions other than the second end portion 18 in the base member 12. At least one of the accommodating structure 38 and the second electric power source 36 can be provided to the operating member 14.

The operating device 10 for the human-powered vehicle 2 comprises an accommodating structure 38. The base member 12 includes the accommodating structure 38. The accommodating structure 38 configured to accommodate the first electric power source 34. The accommodating structure 38 is provided to the second end portion 18. The accommodating structure 38 is disposed at a location which is the farthest from the first end portion 16 in the second end portion 18 along the longitudinal direction D1 as viewed along the pivot axis A1. However, the accommodating structure 38 can be provided to portions other than the second end portion 18 in the base member 12 or other than the base member 12 (e.g., the operating member 14) in the operating device 10.

The operating device 10 for the human-powered vehicle 2 comprises a first substrate 40. The first substrate 40 is provided to one of the base member 12 and the operating member 14. The operating device 10 for the human-powered vehicle 2 comprises a second substrate 42. The second substrate 42 is provided to the one of the base member 12 and the operating member 14. The second substrate 42 is separate from the first substrate 40. At least one of the first substrate 40 and the second substrate 42 is accommodated at the second end portion 18.

In the present embodiment, the first substrate 40 and the second substrate 42 are provided to the base member 12. The first substrate 40 and the second substrate 42 are accommodated at the second end portion 18. However, at least one of the first substrate 40 and the second substrate 42 can be provided to the operating member 14. At least one of the first substrate 40 and the second substrate 42 can be provided to other parts other than the second end portion 18 in the base member 12. The second substrate 42 can be integrally provided with the first substrate 40 as a one-piece unitary member. The first substrate 40 can also be referred to as first circuitry or a first circuit board. The second substrate 42 can also be referred to as second circuitry or a second circuit board. The operating device 10 for the human-powered vehicle 2 comprises circuitry 43. The circuitry 43 includes the first substrate 40 and the second substrate 42.

The operating device 10 comprises a connector CN to which at least one electric control cable is to be detachably connected. The connector CN is attached to the base member 12. In the present embodiment, the connector CN includes a plurality of connection ports configured to detachably receive a plurality of electric control cables. The circuitry 43 is configured to be electrically connected to the first electric power source 34, the second electric power source 36, the switches SW1, SW2 and SW3, and the connector CN. The connector CN can include one connection port or at least three connection ports.

The term "detachable and/or attachable," as used herein, encompasses a configuration in which an element is repeatedly detachable from and attachable to another element without substantial damage.

The operating device 10 comprises an additional accommodating structure 44. The base member 12 includes the additional accommodating structure 44. The additional accommodating structure 44 is configured to accommodate at least one of the second electric power source 36, the first substrate 40, and the second substrate 42. In the present embodiment, the additional accommodating structure 44 is configured to accommodate the second electric power source 36, the first substrate 40, and the second substrate 42. However, the additional accommodating structure 44 can be configured to accommodate only one or two of the second electric power source 36, the first substrate 40, and the second substrate 42. One of the accommodating structure 38 and the additional accommodating structure 44 can be omitted from the operating device 10.

The base member 12 includes a base body 46 and an accommodating housing 48. The accommodating housing 48 includes the accommodating structure 38 and the additional accommodating structure 44. The accommodating housing 48 is a separate member form the base body 46 and is secured to the base body 46 with a fastener or a bonding structure such as adhesive. The base body 46 includes the first end portion 16 and the grip portion 20 of the base member 12. The operating member 14 is pivotally coupled to the base body 46 about the pivot axis A1. However, the accommodating housing 48 can be integrally provided with the base body 46 as a one-piece unitary member. The position of the accommodating housing 48 in the base member 12 is not limited to the second end portion 18.

Figure 2:
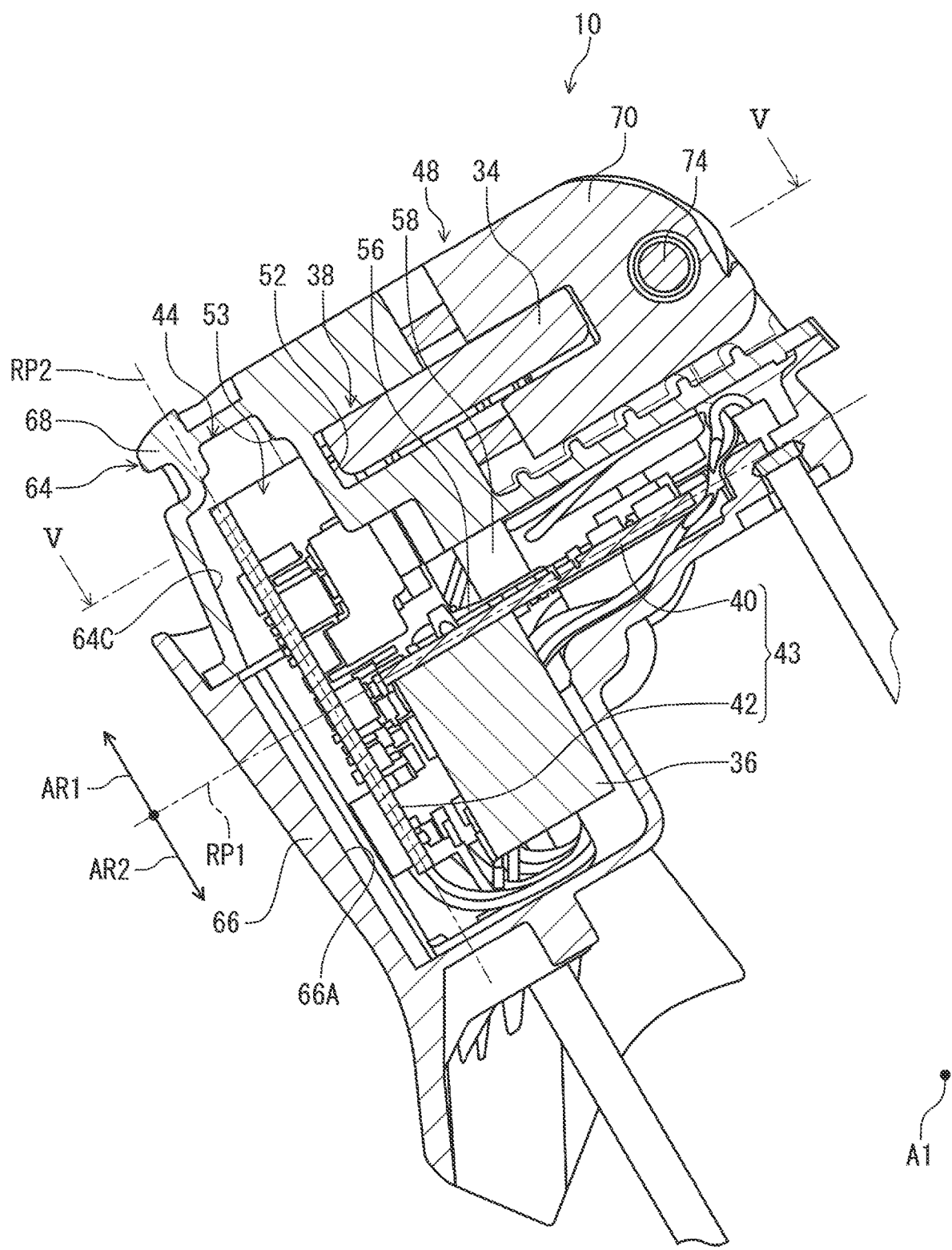
FIG. 2 is a cross-sectional view of the operating device illustrated in FIG. 1 taken along line II-II in FIG. 5.

As seen in FIG. 2, the accommodating structure 38 includes an accommodating space 52 in which the first electric power source 34 is to be provided. The additional accommodating structure 44 includes an additional accommodating space 53 in which at least one of the second electric power source 36, the first substrate 40, and the second substrate 42 is to be provided. In the present embodiment, the additional accommodating structure 44 includes an additional accommodating space 53 in which the second electric power source 36, the first substrate 40, and the second substrate 42 are to be provided.

The first substrate 40 extends along a first reference plane RP1. The second substrate 42 extends along a second reference plane RP2 different from the first reference plane RP1. The first reference plane RP1 is non-parallel to the first reference plane RP1. The first reference plane RP1 is perpendicular to the second reference plane RP2. The first substrate 40 extends along the pivot axis A1. The first reference plane RP1 is parallel to the pivot axis A1. However, the first reference plane RP1 can be non-perpendicular to the second reference plane RP2. The first reference plane RP1 can be non-parallel to the pivot axis A1.

The first reference plane RP1 defines a first area AR1 and a second area AR2 provided on a reverse side of the first area AR1 with respect to the first reference plane RP1. The accommodating structure 38 is provided in one of the first area AR1 and the second area AR2. The second electric power source 36 is provided in the other of the first area AR1 and the second area AR2. The first substrate 40 is provided between the accommodating structure 38 and the second electric power source 36. In the present embodiment, the accommodating structure 38 is provided in the first area AR1. The second electric power source 36 is provided in the second area AR2. However, the accommodating structure 38 can be provided in the second area AR2. The second electric power source 36 can be provided in the first area AR1.

The second electric power source 36 is electrically connected to the first substrate 40. The second electric power source 36 is electrically mounted on the first substrate 40. However, the second electric power source 36 can be electrically mounted on the second substrate 42 or other substrates. The second electric power source 36 can be electrically connected to the second substrate 42 or other substrates.

Figure 3:
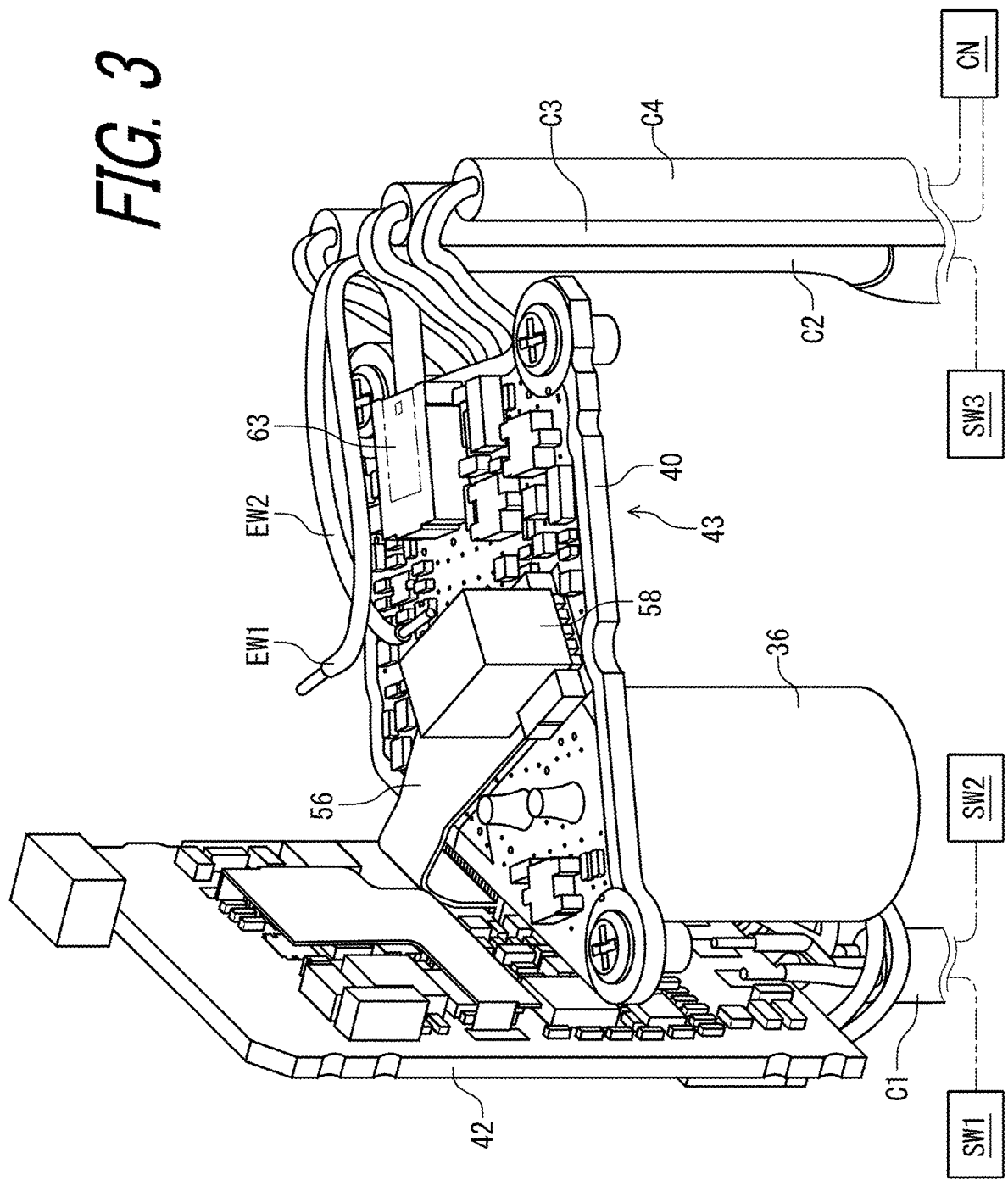
FIG. 3 is a perspective view of an internal structure of the operating device illustrated in FIG. 1.

As seen in FIG. 3, the operating device 10 further comprises a third substrate 56. The third substrate 56 is configured to electrically connect the first substrate 40 to the second substrate 42. The third substrate 56 is a different substrate from the first substrate 40 and the second substrate 42. In the present embodiment, the third substrate 56 includes a flexible member configured to electrically connect the first substrate 40 to the second substrate 42. The third substrate 56 includes a flexible printed circuit configured to electrically connect the first substrate 40 to the second substrate 42.

The operating device 10 further comprises a substrate support 58. The substrate support 58 is configured to support the third substrate 56 relative to at least one of the operating member 14, the base member 12, the first substrate 40 and the second substrate 42. The substrate support 58 is configured to support the third substrate 56 to reduce movement of the flexible substrate relative to at least one of the operating member 14, the base member 12, the first substrate 40 and the second substrate 42. In the present embodiment, the substrate support 58 is configured to support the third substrate 56 relative to the base member 12, the first substrate 40 and the second substrate 42. The substrate support 58 includes an elastic member. The elastic member is configured to reduce vibration of the flexible substrate. The substrate support 58 is made of an elastic material such as rubber. However, the substrate support 58 can include other materials other than the elastic member or the elastic material.

As seen in FIG. 2, the third substrate 56 and the substrate support 58 are provided in the additional accommodating space 53 of the additional accommodating structure 44. The substrate support 58 is provided between the third substrate 56 and the accommodating housing 48. The third substrate 56 and the substrate support 58 are provided in the first area AR1. However, at least one of the third substrate 56 and the substrate support 58 can be provided in the second area AR2 or outside the additional accommodating space 53.

Figure 4:
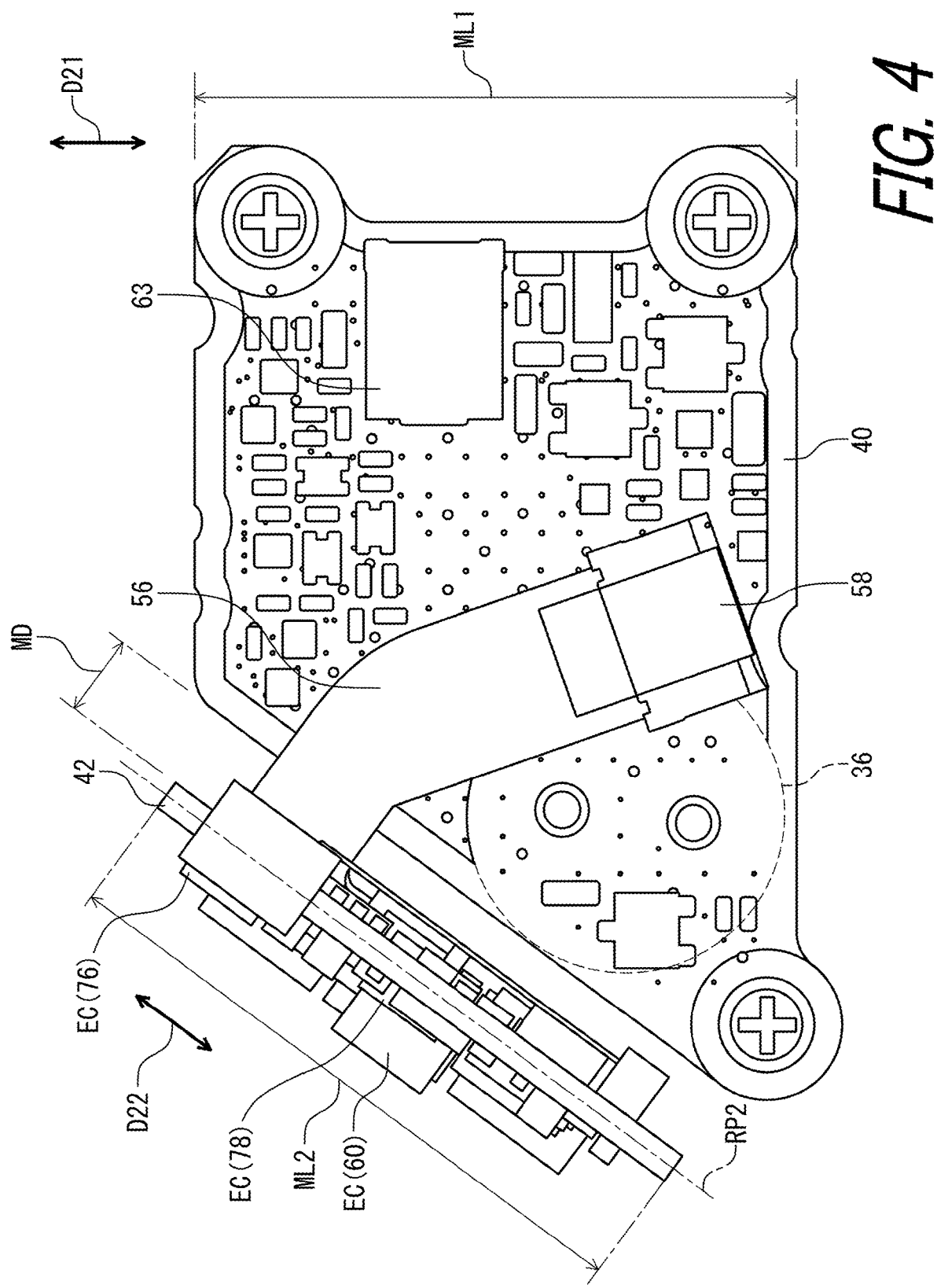
FIG. 4 is a plan view of the internal structure of the operating device illustrated in FIG. 1.

As seen in FIG. 4, the first substrate 40 is spaced apart from the second substrate 42. The first substrate 40 has a first minimum length ML1 defined in a first direction D21 along the first reference plane RP1. The second substrate 42 has a second minimum length ML2 defined in a second direction D22 along the second reference plane RP2. At least one of the first minimum length ML1 and the second minimum length ML2 is larger than a minimum distance MD defined between the first substrate 40 and the second substrate 42. In the present embodiment, the first minimum length ML1 and the second minimum length ML2 are larger than a minimum distance MD. The second minimum length ML2 is larger than the first minimum length ML1. However, at least one of the first minimum length ML1 and the second minimum length ML2 can be equal to or smaller than the minimum distance MD. The second minimum length ML2 can be equal to or smaller than the first minimum length ML1.

The operating device 10 comprises a wireless communicator 60. The wireless communicator 60 is configured to wirelessly communicate with another wireless communicator. In the present embodiment, the wireless communicator 60 is electrically mounted on the second substrate 42. However, the wireless communicator 60 can be electrically mounted on the first substrate 40 or other substrates.

The second electric power source 36 is electrically connected so as to supply electricity to the wireless communicator 60. The second electric power source 36 is electrically connected so as to supply electricity to the wireless communicator 60 through the first substrate 40, the third substrate 56, and the second substrate 42. The first electric power source 34 can be configured to charge the second electric power source 36. The first electric power source 34 can be configured to supply electricity to the second electric power source 36 and the wireless communicator 60 at a predetermined ratio between the second electric power source 36 and the wireless communicator 60.

Figure 5:
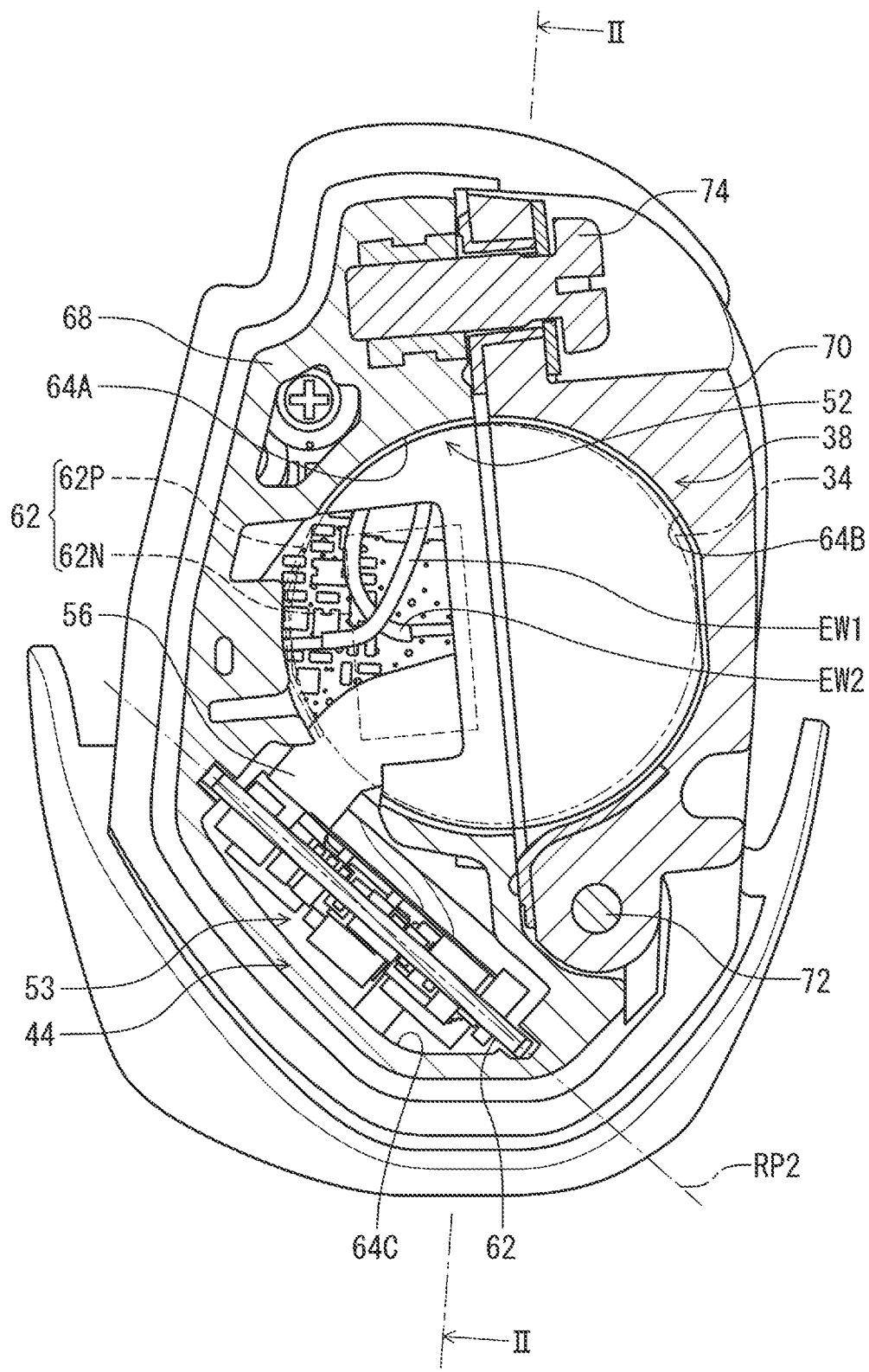
FIG. 5 is a cross-sectional view of the operating device illustrated in FIG. 1 taken along line V-V in FIG. 1.

As seen in FIG. 5, the accommodating structure 38 includes an electrical contact 62. The electrical contact 62 is configured to be in contact with the first electric power source 34 in an accommodation state where the accommodating structure 38 accommodates the first electric power source 34. The electrical contact 62 includes a positive contact 62P and a negative contact 62N separated from the positive contact 62P. The electrical contact 62 is provided in the accommodating space 52 of the accommodating structure 38. The positive contact 62P and the negative contact 62N are provided in the accommodating space 52 of the accommodating structure 38. The positive contact 62P is electrically connected to a first electric wire EW1. The negative contact 62N is electrically connected to a second electric wire EW2.

As seen in FIG. 3, the first electric wire EW1 and the second electric wire EW2 are electrically connected to the first substrate 40. Thus, the second electric power source 36 is configured to be electrically connected to the electrical contact 62. The second electric power source 36 is configured to be electrically connected to the positive contact 62P and the negative contact 62N. The second electric power source 36 is configured to be electrically connected to the electrical contact 62 through the first substrate 40, the first electric wire EW1, and the second electric wire EW2. The second electric power source 36 is configured to be electrically connected to the positive contact 62P through the first substrate 40 and the first electric wire EW1. The second electric power source 36 is configured to be electrically connected to the negative contact 62N through the first substrate 40 and the second electric wire EW2.

Figure 7:
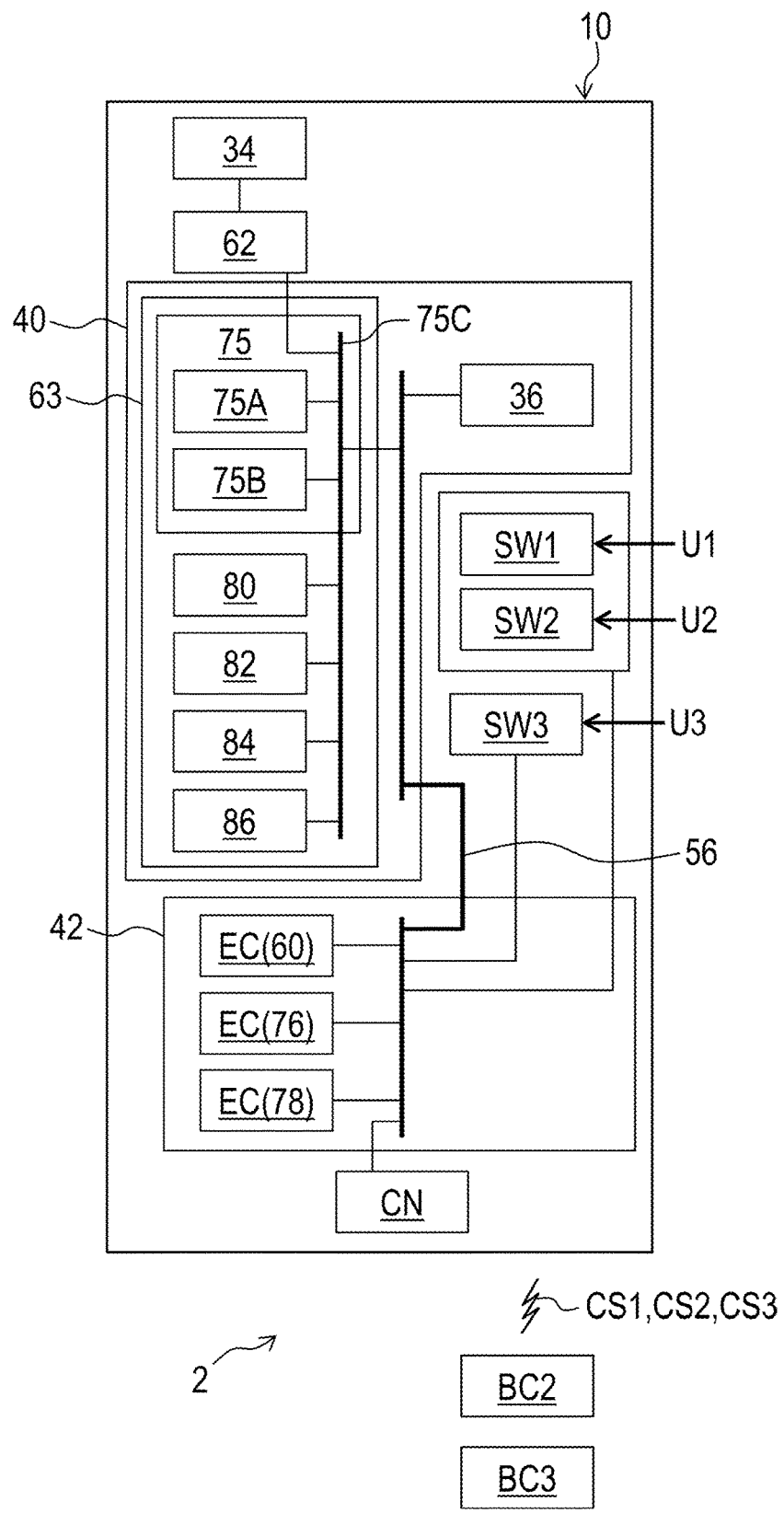
FIG. 7 is a schematic block diagram of a human-powered vehicle including the operating device illustrated in FIG. 1.

As seen in FIG. 7, the electrical contact 62 is configured to connect the first electric power source 34 and the second electric power source 36 in parallel. The operating device 10 further comprises a controller 63. The controller 63 can also be referred to as a voltage controller 63. The voltage controller 63 is electrically mounted on the first substrate 40. The voltage controller 63 is directly connected to the electrical contact 62. The voltage controller 63 is configured to be electrically connected to the first electric power source 34 through the first electric wire EW1, the second electric wire EW2, and the electrical contact 62. The voltage controller 63 is configured to be electrically connected to the second electric power source 36 through the first substrate 40. The electrical contact 62 is electrically connected to the second electric power source 36 via the voltage controller 63 and the first substrate 40. The first electric power source 34 is configured to be electrically connected to the second electric power source 36 via the electrical contact 62, the voltage controller 63, and the first substrate 40. The voltage controller 63 is configured to control charging power from the first electric power source 34 (see, e.g., FIG. 5) to the second electric power source 36. For example, the second electric power source 36 is configured to supplement electricity supplied from the first electric power source 34 to electric components such as the wireless communicator 60 (see, e.g., FIG. 4). The voltage controller 63 is configured to control power supply from the first electric power source 34 and the second electric power source 36 to electric components such as the wireless communicator 60.

The switches SW1 and SW2 are electrically connected to the second substrate 42 through an electric cables C1. The switch SW3 is electrically connected to the first substrate 40 through an electric cable C2. The connector CN is electrically connected to the first substrate 40 through electric cables C3 and C4.

Figure 6:
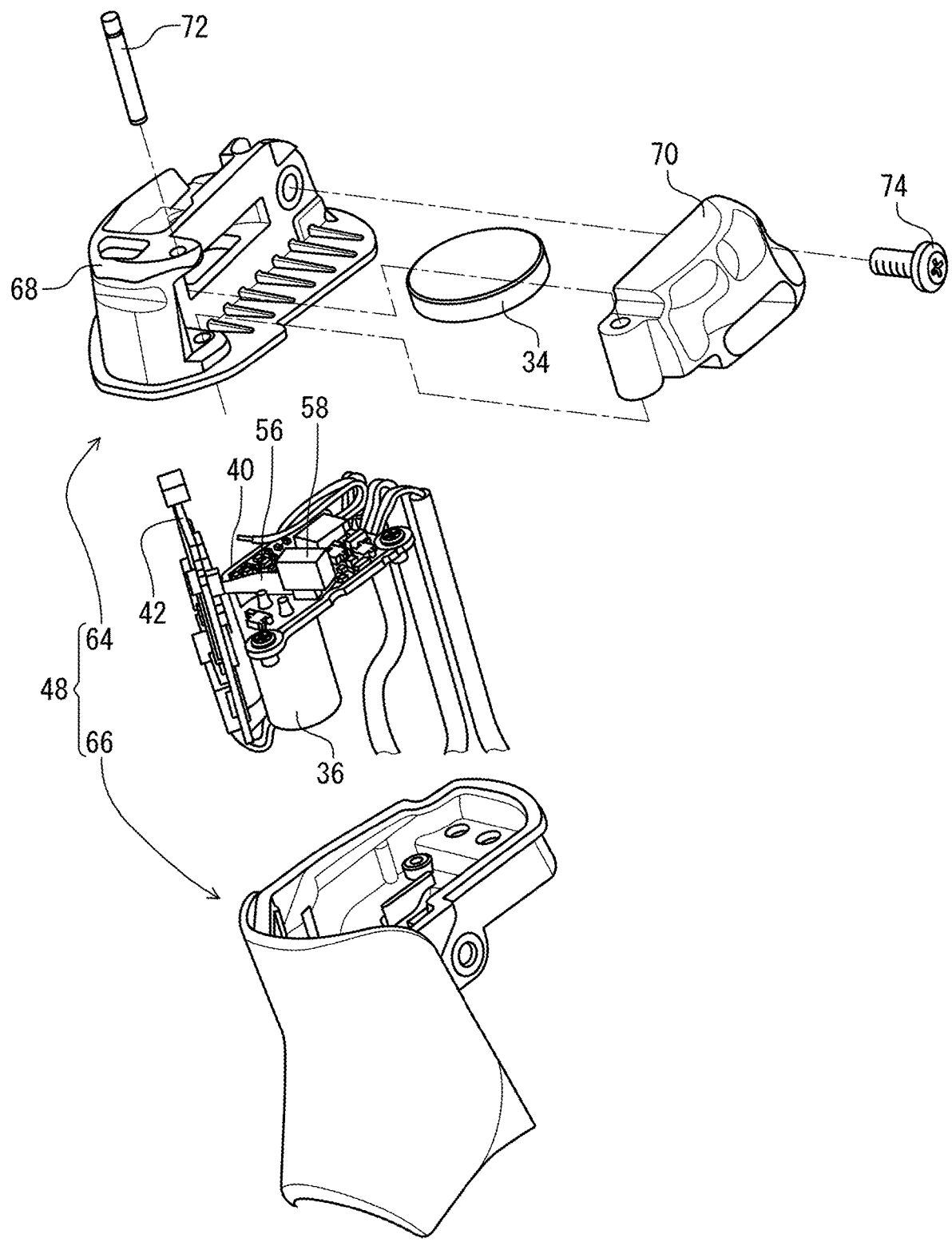
FIG. 6 is an exploded perspective view of an accommodating housing of the operating device illustrated in FIG. 1.

As seen in FIG. 6, the accommodating housing 48 includes a first housing 64 and a second housing 66. The second housing 66 is configured to be attached to the first housing 64. The accommodating structure 38 is provided to at least one of the first housing 64 and the second housing 66 so as to accommodate the first electric power source 34. The additional accommodating structure 44 is provided to at least one of the first housing 64 and the second housing 66 so as to accommodate the second electric power source 36. In the present embodiment, the accommodating structure 38 is provided to the first housing 64. The additional accommodating structure 44 is provided to the first housing 64 and the second housing 66. However, the accommodating structure 38 can be provided to the second housing 66 or both the first housing 64 and the second housing 66. The additional accommodating structure 44 can be provided to only one of the first housing 64 and the second housing 66.

The second housing 66 is a separate member from the first housing 64. Each of the first housing 64 and the second housing 66 is made of a non-metallic material such as a fiber-reinforced plastic. However, the material of the first housing 64 and the second housing 66 is not limited to this embodiment.

The first housing 64 includes a housing body 68, a lid 70, a pivot pin 72, and a fastener 74. The lid 70 is pivotally coupled to the housing body 68 through the pivot pin 72. The fastener 74 is configured to fasten the lid 70 to the housing body 68.

As seen in FIG. 5, the first housing 64 includes a first recess 64A and a first additional recess 64B. The housing body 68 includes the first recess 64A. The lid 70 includes the first additional recess 64B. The first recess 64A and the first additional recess 64B at least partly constitute the accommodating space 52.

As seen in FIG. 2, the second housing 66 includes a second recess 66A. The first housing 64 includes a second additional recess 64C. The second recess 66A and the second additional recess 64C at least partly constitute the additional accommodating space 53. The structure of the accommodating housing 48 is not limited to the illustrated structure.

In the present embodiment, the operating device 10 is a right-hand side operating/control device configured to be operated by the rider's right hand to actuate the operated device BC1, the electric device BC2, and/or an additional electric device BC3. However, the structures of the operating device 10 can be applied to a left-hand side operating device. For example, the operating device 10 and the left-hand side operating device can be symmetric with respect to a transverse center plane of a vehicle body of the human-powered vehicle 2 in a state where the operating device 10 and the left-hand side operating device are mounted to the vehicle body of the human-powered vehicle 2.

As seen in FIG. 7, the controller 63 includes a main controller 75. The main controller 75 includes a processor 75A, a memory 75B, and a system bus 75C. Namely, the controller 63 includes the memory 75B. The processor 75A and the memory 75B are electrically mounted on the second substrate 42. The processor 75A includes a central processing unit (CPU) and a memory controller. The processor 75A is electrically connected to the memory 75B with the second substrate 42 and the system bus 75C.

The memory 75B includes a read only memory (ROM) and a random-access memory (RAM). The memory 75B includes storage areas each having an address in the ROM and the RAM. The processor 75A is configured to control the memory 75B to store data in the storage areas of the memory 75B and reads data from the storage areas of the memory 75B. The memory 75B (e.g., the ROM) stores a program. The program is read into the processor 75A, and thereby the configuration and/or algorithm of the controller 63, the wireless communicator 60, and other electric components is performed.

The operating device 10 comprises an antenna 76. The operating device 10 further comprises an informing unit 78. The controller 63, the wireless communicator 60, the antenna 76, and the informing unit 78 are electrically mounted on the second substrate 42. The controller 63, the wireless communicator 60, the antenna 76, and the informing unit 78 are electrically connected with each other via the first substrate 40, the second substrate 42, and the third substrate 56. The wireless communicator 60, the antenna 76, and the informing unit 78 can also be referred to as electric components EC.

The wireless communicator 60 is configured to communicate with a wireless communicator of the electric device BC2 using the antenna 76 via the wireless communication channel. The wireless communicator 60 is configured to communicate with a wireless communicator of the additional electric device BC3 using the antenna 76 via the wireless communication channel.

The controller 63 is configured to control components of the operating device 10 and/or another device in response to user inputs U1, U2, and U3 received by the switches SW1, SW2, and SW3. The controller 63 is configured to control the wireless communicator 60 to transmit a control signal CS1 and/or CS2 to the electric device BC2. The controller 63 is configured to control the wireless communicator 60 to transmit a control signal CS3 to the additional electric device BC3.

In the present embodiment, for example, the control signal CS1 indicates upshifting of the electric device BC2. The control signal CS2 indicates downshifting of the electric device BC2. The control signal CS3 indicates that the state of the additional electric device BC3 is changed between the lock state and the adjustable state. However, the control signals CS1, CS2, and CS3 are not limited to the above control commands.

Figure 8:
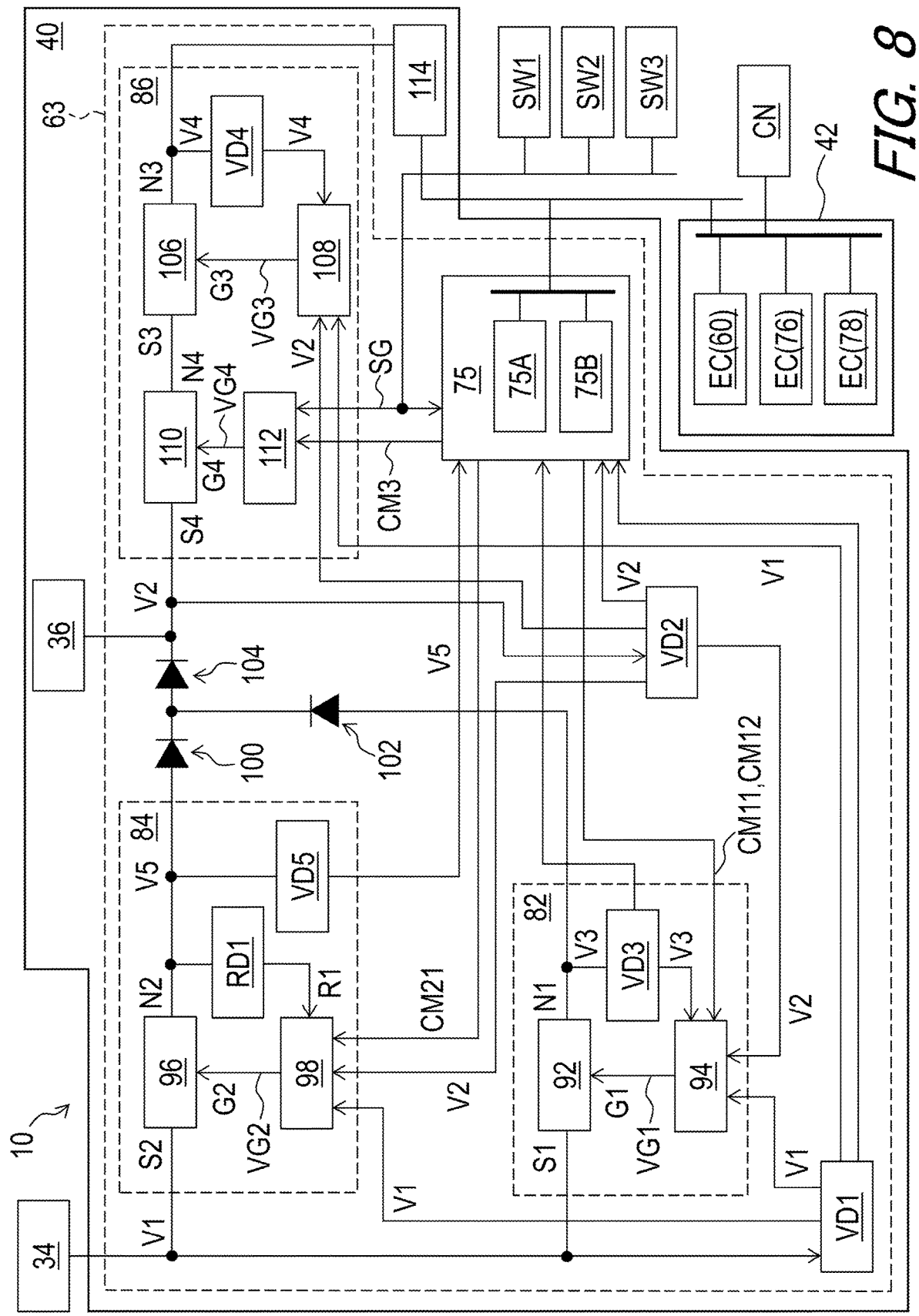
FIG. 8 is a schematic block diagram of the operating device illustrated in FIG. 1.

As seen in FIG. 8, the controller 63 is configured control an electric supply from at least one of the first electric power source 34 and the second electric power source 36 based on information relating to at least one of the first electric power source 34 and the second electric power source 36. The information includes a first electrical state of the first electric power source 34 and a second electrical state of the second electric power source 36. The controller 63 is configured to control the electric supply from at least one of the first electric power source 34 and the second electric power source 36 based on at least one of the first electrical state and the second electrical state.

The first electrical state includes at least one of a first output voltage of the first electric power source 34, a first output current of the first electric power source 34, and a first remaining level of the first electric power source 34. The second electrical state includes at least one of a second output voltage of the second electric power source 36, a second output current of the second electric power source 36, and a second remaining level of the second electric power source 36. In the present embodiment, the first electrical state includes a first output voltage V1 of the first electric power source 34. The second electrical state includes a second output voltage V2 of the second electric power source 36. The first electrical state includes a third output voltage V3 of the first electric power source 34. The second electrical state includes a fourth output voltage V4 of the second electric power source 36. The first electrical state includes a fifth output voltage V5 of the first electric power source 34. The first electrical state includes a first output current R1 of the first electric power source 34. However, the first electrical state and the second electrical state can include other factors.

The operating device 10 further comprises a detector 80 configured to detect the information. In the present embodiment, the detector 80 includes a first voltage detector VD1, a second voltage detector VD2, a third voltage detector VD3, a fourth voltage detector VD4, a fifth voltage detector VD5, and a first current detector RD1. The first voltage detector VD1 is configured to detect the first output voltage V1. The second voltage detector VD2 is configured to detect the second output voltage V2. The third voltage detector VD3 is configured to detect the third output voltage V3. The fourth voltage detector VD4 is configured to detect the fourth output voltage V4. The fifth voltage detector VD5 is configured to detect the fifth output voltage V5. The first current detector RD1 is configured to detect the first output current R1.

The detector 80 is electrically connected to the main controller 75 of the controller 63. The memory 75B is connected to the detector 80 so as to store the information detected by the detector 80. The memory 75B is configured to store the first output voltage V1 detected by the first voltage detector VD1. The memory 75B is configured to store the second output voltage V2 detected by the second voltage detector VD2. The memory 75B is configured to store the third output voltage V3 detected by the third voltage detector VD3. The memory 75B is configured to store the fourth output voltage V4 detected by the fourth voltage detector VD4. The memory 75B is configured to store the first output current R1 detected by the first current detector RD1.

In the present embodiment, the controller 63 is configured to control the electric supply from one of the first electric power source 34 and the second electric power source 36 based on the first electrical state of the first electric power source 34 and the second electrical state of the second electric power source 36. The controller 63 is configured to control the electric supply from the first electric power source 34 to the second electric power source 36 based on the first electrical state of the first electric power source 34 and the second electrical state of the second electric power source 36. The controller 63 is configured to control the electric supply from the second electric power source 36 to the electric components EC based on the first electrical state of the first electric power source 34 and the second electrical state of the second electric power source 36.

The controller 63 includes a first controller 82, a second controller 84, and a third controller 86. The first controller 82 is configured to control an electric supply from the first electric power source 34 to the second electric power source 36 based on the first electrical state and the second electrical state. The second controller 84 is configured to control an electric supply from the first electric power source 34 to the second electric power source 36 based on the first electrical state and the second electrical state. The third controller 86 is configured to control an electric supply from the second electric power source 36 to the electric components EC.

In the present embodiment, the first electric power source 34 is configured to be electrically connected to the second electric power source 36 via the first controller 82. The first electric power source 34 is configured to be electrically connected to the second electric power source 36 via the second controller 84. The first controller 82 and the second controller 84 are arranged between the first electric power source 34 and the second electric power source 36 in parallel.

The first electric power source 34 is configured to be electrically connected to the electric components EC via the first controller 82 and the third controller 86. The first electric power source 34 is configured to be electrically connected to the electric components EC via the second controller 84 and the third controller 86. The first controller 82 and the third controller 86 are arranged between the first electric power source 34 and the electric components EC in series. The second controller 84 and the third controller 86 are arranged between the first electric power source 34 and the electric components EC in series.

Figure 9:
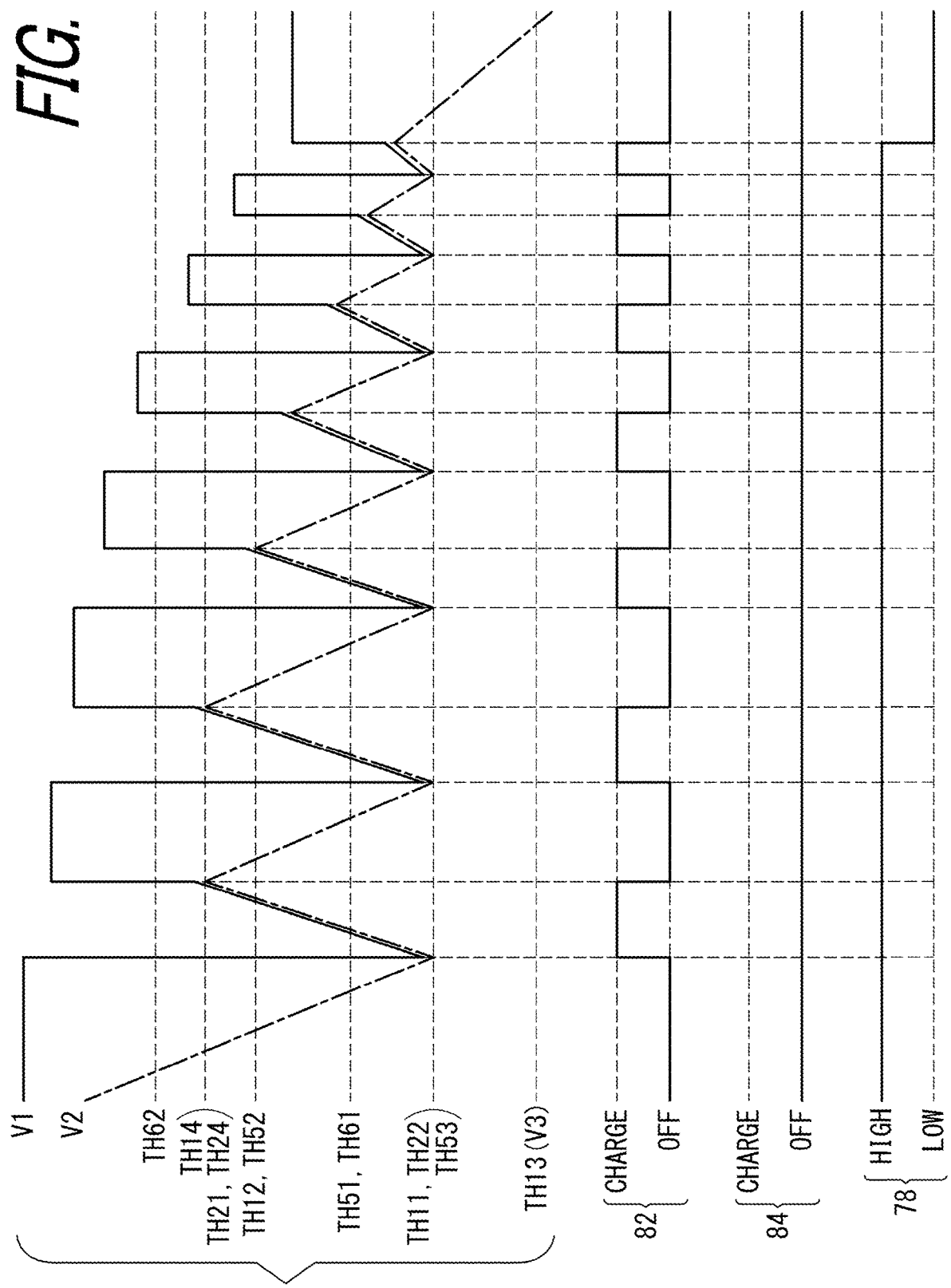
FIG. 9 is a timing chart showing the control of the operating device illustrated in FIG. 1.
Figure 10:
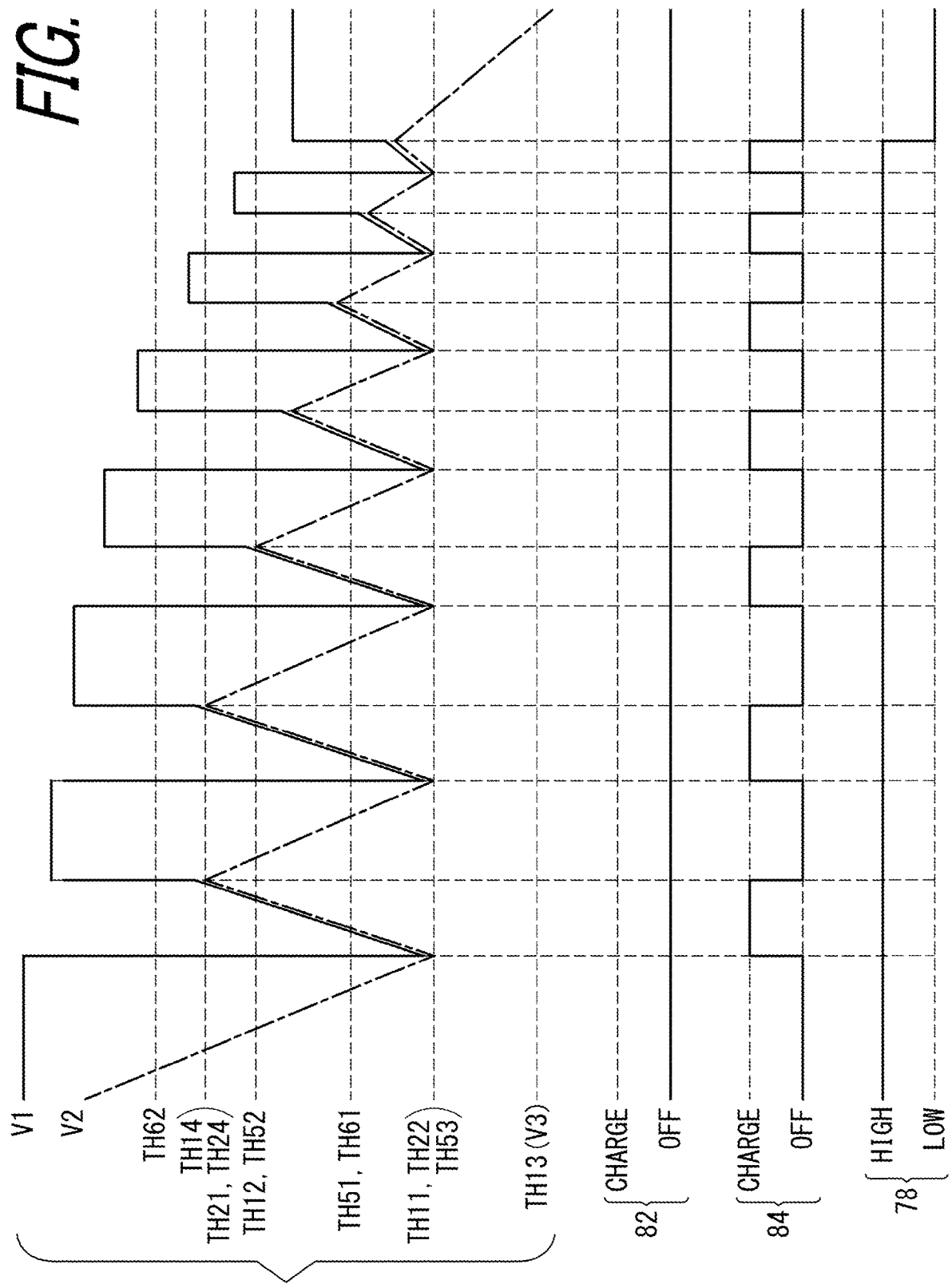
FIG. 10 is a timing chart showing the control of the operating device illustrated in FIG. 1.

As seen in FIGS. 9 and 10, the controller 63 is configured to start to charge the second electric power source 36 using electricity stored in the first electric power source 34 if the first electrical state meets a first charging-start condition and/or if the second electrical state meets a second charging-start condition. The controller 63 is configured to stop charging the second electric power source 36 if the first electrical state meets a first charging-stop condition and/or if the second electrical state meets a second charging-stop condition.

In the present embodiment, as seen in FIG. 9, the first charging-start condition used by the first controller 82 includes a condition that the first output voltage V1 of the first electric power source 34 is equal to or higher than a first charging-start threshold TH11. The second charging-start condition used by the first controller 82 includes a condition that the second output voltage V2 of the second electric power source 36 is equal to or lower than a second charging-start threshold TH12. The main controller 75 is configured to store the first charging-start threshold TH11 and the second charging-start threshold TH12 in the memory 75B.

The first controller 82 is configured to start to charge the second electric power source 36 using electricity stored in the first electric power source 34 if the first output voltage V1 is equal to or higher than the first charging-start threshold TH11 and the second output voltage V2 is equal to or lower than the second charging-start threshold TH12. In the present embodiment, the first controller 82 is configured to start to charge the second electric power source 36 using electricity stored in the first electric power source 34 if the first output voltage V1 is equal to or higher than the first charging-start threshold TH11 (condition CA1), the second output voltage V2 is equal to or lower than the second charging-start threshold TH12 (condition CA2), and the first controller 82 receives a charging permission command CM11 from the main controller 75 (condition CA3). However, the conditions to start to charge the second electric power source 36 are not limited to the above conditions CA1 to CA3.

The first charging-stop condition used by the first controller 82 includes a condition that the third output voltage V3 of the first electric power source 34 is equal to or lower than a first charging-stop threshold TH13. The second charging-start condition used by the first controller 82 includes a condition that the second output voltage V2 of the second electric power source 36 is equal to or higher than a second charging-stop threshold T1114.

The first controller 82 is configured to stop charging the second electric power source 36 if the third output voltage V3 is equal to or lower than the first charging-stop threshold TH13 or the second output voltage V2 is equal to or higher than the second charging-stop threshold TH14. In the present embodiment, the first controller 82 is configured to stop charging the second electric power source 36 if the third output voltage V3 is equal to or lower than the first charging-stop threshold TH13 (condition CB1), the second output voltage V2 is equal to or higher than the second charging-stop threshold TH14 (condition CB2), or the first controller 82 receives a charging stop command CM12 from the main controller 75 (condition CB3). However, the conditions to stop charging the second electric power source 36 are not limited to the above conditions CB1 to CB3.

In the present embodiment, as seen in FIG. 10, the first charging-start condition used by the second controller 84 includes a condition that the first output voltage V1 of the first electric power source 34 is equal to or higher than a first charging-start threshold TH21. The second charging-start condition used by the second controller 84 includes a condition that the second output voltage V2 of the second electric power source 36 is equal to or lower than a second charging-start threshold TH22.

The second controller 84 is configured to start to charge the second electric power source 36 using electricity stored in the first electric power source 34 if the first output voltage V1 is equal to or higher than the first charging-start threshold TH21 and the second output voltage V2 is equal to or lower than the second charging-start threshold TH22. In the present embodiment, the second controller 84 is configured to start to charge the second electric power source 36 using electricity stored in the first electric power source 34 if the first output voltage V1 is equal to or higher than the first charging-start threshold TH21 (condition CC1), the second output voltage V2 is equal to or lower than the second charging-start threshold TH22 (condition CC2), and the second controller 84 does not receive a charging prohibition command CM21 from the main controller 75 (condition CC3). However, the conditions to start to charge the second electric power source 36 are not limited to the above conditions CC1 to CC3.

The first charging-stop condition used by the second controller 84 includes a condition that the first output current R1 of the first electric power source 34 is lower than a first charging-stop threshold TH23. The second charging-stop condition includes a condition that the second output voltage V2 of the second electric power source 36 is higher than a second charging-stop threshold TH24.

The second controller 84 is configured to stop charging the second electric power source 36 if the first output current R1 is lower than the first charging-stop threshold TH23 or the second output voltage V2 is higher than the second charging-stop threshold TH24. In the present embodiment, the second controller 84 is configured to stop charging the second electric power source 36 if the first output current R1 is lower than the first charging-stop threshold TH23 (condition CD1), the second output voltage V2 is higher than the second charging-stop threshold TH24 (condition CD2), or the second controller 84 receives the charging prohibition command CM21 from the main controller 75 (condition CD3). However, the conditions to stop charging the second electric power source 36 are not limited to the above conditions CD1 to CD3.

As seen in FIGS. 9 and 10, the controller 63 is configured to start to supply electricity from the second electric power source 36 to the electric component EC if the first electrical state meets a first supplying-start condition and/or if the second electrical state meets a second supplying-start condition. The controller 63 is configured to stop supplying electricity from the second electric power source 36 to the electric component EC if the first electrical state meets a first supplying-stop condition and/or if the second electrical state meets a second supplying-stop condition.

In the present embodiment, the first supplying-start condition used by the third controller 86 includes a condition that the first output voltage V1 of the first electric power source 34 is equal to or higher than a first supplying-start threshold TH31. The second supplying-start condition used by the third controller 86 includes a condition that the second output voltage V2 of the second electric power source 36 is equal to or higher than a second supplying-start threshold TH32. A third supplying-start condition used by the third controller 86 includes a condition that at least one of the switches SW1, SW2, and SW3 is operated by the user. The main controller 75 is configured to store the first supplying-start threshold TH31 and the second supplying-start threshold TH32 in the memory 75B.

The third controller 86 is configured to start the electric supply from the second electric power source 36 to the electric components EC if the first output voltage V1 is equal to or higher than the first supplying-start threshold TH31 (condition CE1), the second output voltage V2 is equal to or higher than the second supplying-start threshold TH32 (condition CE2), and at least one of the switches SW1, SW2, and SW3 is operated (condition CE3). However, the conditions to start the electric supply from the second electric power source 36 are not limited to the above conditions CE1 to CE3.

The first supplying-stop condition used by the third controller 86 includes a condition that the fourth output voltage V4 of the second electric power source 36 is lower than a first supplying-stop threshold TH33. The second supplying-stop condition used by the third controller 86 includes a condition that the third controller 86 receives a supplying stop command CM3 from the main controller 75.

The third controller 86 is configured to stop charging the second electric power source 36 if the fourth output voltage V4 is equal to or lower than the first supplying-stop threshold TH33 (condition CF1) or the third controller 86 receives the supplying stop command CM3 from the main controller 75 (condition CF2). However, the conditions to stop charging the second electric power source 36 are not limited to the above conditions CF1 and CF2.

The main controller 75 is configured to select one of the first controller 82 and the second controller 84 as a default controller configured to charge the second electric power source 36. In the present embodiment, the main controller 75 is configured to select the first controller 82 as the default controller. The main controller 75 is configured to use the first controller 82 to charge the second electric power source 36 while the controller 63 is turned on. The controller 63 remains turned on until a determination time (e.g., 30 mins) lapses after the latest operation of the switch SW1, SW2, or SW3. The first controller 82 is configured to charge the second electric power source 36 while the controller 63 is turned off if the above-mentioned conditions meet. The controller 63 is turned off or enters a sleep mode when the determination time (e.g., 30 mins) lapses after the latest operation of the switch SW1, SW2, or SW3. The second controller 84 is configured to charge the second electric power source 36 while the controller 63 is turned off if the above-mentioned conditions meet.

In the present embodiment, the first controller 82 is configured to allow the electric supply from the first electric power source 34 to the second electric power source 36 via the first controller 82 if the second controller 84 interrupts the electric supply from the first electric power source 34 to the second electric power source 36 via the second controller 84 and the third controller 86 interrupts the electric supply from the second electric power source 36 to the electric components EC via the third controller 86. The first controller 82 is configured to stop the electric supply from the first electric power source 34 to the second electric power source 36 via the first controller 82 if the second controller 84 allows the electric supply from the first electric power source 34 to the second electric power source 36 or the third controller 86 allows the electric supply from the second electric power source 36 to the electric components EC via the third controller 86.

The main controller 75 is configured to generate the charging permission command CM11 if the second controller 84 interrupts the electric supply from the first electric power source 34 to the second electric power source 36 via the second controller 84 and the third controller 86 interrupts the electric supply from the second electric power source 36 to the electric components EC via the third controller 86. For example, the main controller 75 is configured to generate the charging permission command CM11 if one of the charging-stop conditions (e.g., the conditions CD1 to CD3) used by the second controller 84 is met and the supplying-stop conditions (e.g., the conditions CF1 and CF2) used by the third controller 86 are met.

The main controller 75 is configured to not generate the charging peimission command CM11 if the second controller 84 allows the electric supply from the first electric power source 34 to the second electric power source 36 or the third controller 86 allows the electric supply from the second electric power source 36 to the electric components EC. For example, the main controller 75 is configured to not generate the charging permission command CM11 if the charging-start conditions (e.g., the conditions CC1 to CC3) used by the second controller 84 are met or the supplying-start conditions (e.g., the conditions CE1 to CE3) used by the third controller 86 are met.

In the present embodiment, the second controller 84 is configured to allow the electric supply from the first electric power source 34 to the second electric power source 36 via the second controller 84 if the first controller 82 interrupts the electric supply from the first electric power source 34 to the second electric power source 36 via the first controller 82 and the third controller 86 interrupts the electric supply from the second electric power source 36 to the electric components EC via the third controller 86. The second controller 84 is configured to stop the electric supply from the first electric power source 34 to the second electric power source 36 via the second controller 84 if the first controller 82 allows the electric supply from the first electric power source 34 to the second electric power source 36 or the third controller 86 allows the electric supply from the second electric power source 36 to the electric components EC via the third controller 86.

The main controller 75 is configured to not generate the charging prohibition command CM21 if the first controller 82 interrupts the electric supply from the first electric power source 34 to the second electric power source 36 via the first controller 82 and the third controller 86 interrupts the electric supply from the second electric power source 36 to the electric components EC via the third controller 86. For example, the main controller 75 is configured to not generate the charging prohibition command CM21 if one of the charging-stop conditions (e.g., the conditions CB1 to CB3) used by the first controller 82 is met and the supplying-stop conditions (e.g., the conditions CF1 and CF2) used by the third controller 86 are met.

The main controller 75 is configured to generate the charging prohibition command CM21 if the first controller 82 allows the electric supply from the first electric power source 34 to the second electric power source 36 or the third controller 86 allows the electric supply from the second electric power source 36 to the electric components EC. For example, the main controller 75 is configured to generate the charging prohibition command CM21 if the charging-start conditions (e.g., the conditions CA1 to CA3) used by the first controller 82 are met or the supplying-start conditions (e.g., the conditions CE1 to CE3) used by the third controller 86 are met.

In the present embodiment, the third controller 86 is configured to allow the electric supply from the second electric power source 36 to the electric components EC via the third controller 86 if the first controller 82 interrupts the electric supply from the first electric power source 34 to the second electric power source 36 via the first controller 82 and the second controller 84 interrupts the electric supply from the first electric power source 34 to the second electric power source 36 via the second controller 84. The third controller 86 is configured to stop the electric supply from the second electric power source 36 to the electric components EC via the third controller 86 if the first controller 82 allows the electric supply from the first electric power source 34 to the second electric power source 36 or the second controller 84 allows the electric supply from the first electric power source 34 to the second electric power source 36 via the second controller 84.

The main controller 75 is configured to not generate the supplying stop command CM3 if the first controller 82 interrupts the electric supply from the first electric power source 34 to the second electric power source 36 via the first controller 82 and the second controller 84 interrupts the electric supply from the first electric power source 34 to the second electric power source 36 via the second controller 84. For example, the main controller 75 is configured to not generate the supplying stop command CM3 if one of the charging-stop conditions (e.g., the conditions CB1 to CB3) used by the first controller 82 is met and one of the supplying-stop conditions (e.g., the conditions CD1 to CD3) used by the second controller 84 is met.

The main controller 75 is configured to generate the supplying stop command CM3 if the first controller 82 allows the electric supply from the first electric power source 34 to the second electric power source 36 or the second controller 84 allows the electric supply from the first electric power source 34 to the second electric power source 36. For example, the main controller 75 is configured to generate the supplying stop command CM3 if the charging-start conditions (e.g., the conditions CA1 to CA3) used by the first controller 82 are met or the charging-start conditions used by the second controller 84 (e.g., the conditions CC1 to CC3) are met.

As seen in FIG. 8, the first controller 82 includes a first field-effect transistor (FET) 92. The first FET 92 is configured to control the flow of current between a first source terminal S1 and a first drain terminal N1 in response to a first gate voltage VG1 applied to a first gate terminal G1. The first FET 92 is configured to allow the flow of current between the first source terminal S1 and the first drain terminal N1 while the first gate voltage VG1 applied to the first gate terminal G1 is higher than a first threshold voltage of the first FET 92. The first FET 92 is configured to interrupt the flow of current between the first source terminal S1 and the first drain terminal N1 while the first gate voltage VG1 applied to the first gate terminal G1 is equal to or lower than the first threshold voltage. For example, the first FET 92 includes a p-type metal-oxide-semiconductor field-effect transistor (MOSFET). However, the first FET 92 can include other FETs such as a n-type MOSEFT.

The first controller 82 includes a first gate driver 94. The first gate driver 94 is configured to apply the first gate voltage VG1 to the first gate terminal G1. The first gate voltage VG1 applied from the first gate driver 94 is higher than the first threshold voltage.

The first gate driver 94 is configured to receive the first output voltage V1 detected by the first voltage detector VD1, the second output voltage V2 detected by the second voltage detector VD2, and the charging permission command CM11 generated by the main controller 75. The first gate driver 94 is configured to apply the first gate voltage VG1 to the first gate terminal G1 if the first output voltage V1 is equal to or higher than the first charging-start threshold TH11, the second output voltage V2 is equal to or lower than the second charging-start threshold TH12, and the first gate driver 94 receives the charging permission command CM11 from the main controller 75. Thus, the first FET 92 is configured to allow the electric supply from the first electric power source 34 to the second electric power source 36 if the above conditions are met.

The first gate driver 94 is configured to receive the third output voltage V3 detected by the third voltage detector VD3 and the charging stop command CM12 generated by the main controller 75. The first gate driver 94 is configured to stop applying the first gate voltage VG1 to the first gate terminal G1 if the third output voltage V3 is equal to or lower than the first charging-stop threshold TH13, the second output voltage V2 is equal to or higher than the second charging-stop threshold TH14, or the first gate driver 94 receives the charging stop command CM12 from the main controller 75. Thus, the first FET 92 is configured to interrupt the electric supply from the first electric power source 34 to the second electric power source 36 if the above condition is met.

As seen in FIG. 8, the second controller 84 includes a second field-effect transistor (FET) 96. The second FET 96 is configured to control the flow of current between a second source terminal S2 and a second drain terminal N2 in response to a second gate voltage VG2 applied to a second gate terminal G2. The second FET 96 is configured to allow the flow of current between the second source terminal S2 and the second drain terminal N2 while the second gate voltage VG2 applied to the second gate terminal G2 is higher than a second threshold voltage of the second FET 96. The second FET 96 is configured to interrupt the flow of current between the second source terminal S2 and the second drain terminal N2 while the second gate voltage VG2 applied to the second gate terminal G2 is equal to or lower than the second threshold voltage. For example, the second FET 96 includes a p-type metal-oxide-semiconductor field-effect transistor (MOSFET). However, the second FET 96 can include other FETs such as a n-type MOSEFT.

The second controller 84 includes a second gate driver 98. The second gate driver 98 is configured to apply the second gate voltage VG2 to the second gate terminal G2. The second gate voltage VG2 applied from the second gate driver 98 is higher than the second threshold voltage.

The second gate driver 98 is configured to receive the first output voltage V1 detected by the first voltage detector VD1, the second output voltage V2 detected by the second voltage detector VD2, and the charging prohibition command CM21 generated by the main controller 75. The second gate driver 98 is configured to apply the second gate voltage VG2 to the second gate terminal G2 if the first output voltage V1 is equal to or higher than the first charging-start threshold TH21, the second output voltage V2 is equal to or lower than the second charging-start threshold TH22, and the second gate driver 98 does not receive the charging prohibition command CM21 from the main controller 75. Thus, the second controller 84 is configured to allow the electric supply from the first electric power source 34 to the second electric power source 36 if the above conditions are met.

The second gate driver 98 is configured to receive the first output current R1 detected by the first current detector VR1. The second gate driver 98 is configured to stop applying the second gate voltage VG2 to the second gate terminal G2 if the first output current R1 is lower than the first charging-stop threshold TH23, the second output voltage V2 is higher than the second charging-stop threshold TH24, or the second controller 84 receives the charging prohibition command CM21 from the main controller 75. Thus, the second controller 84 is configured to interrupt the electric supply from the first electric power source 34 to the second electric power source 36 if the above condition is met.

The controller 63 includes diodes 100, 102, and 104. The diodes 100, 102, and 104 are configured to allow a current to flow in one direction from the first electric power source 34 to the second electric power source 36. The diodes 100, 102, and 104 are configured to restrict the current from flowing from the second electric power source 36 to the first electric power source 34.

The third controller 86 includes a third field-effect transistor (FET) 106. The third FET 106 is configured to control the flow of current between a third source terminal S3 and a third drain terminal N3 in response to a third gate voltage VG3 applied to a third gate terminal G3. The third FET 106 is configured to allow the flow of current between the third source terminal S3 and the third drain terminal N3 while the third gate voltage VG3 applied to the third gate terminal G3 is higher than a third threshold voltage of the third FET 106. The third FET 106 is configured to interrupt the flow of current between the third source terminal S3 and the third drain terminal N3 while the third gate voltage VG3 applied to the third gate terminal G3 is equal to or lower than the third threshold voltage. For example, the third FET 106 includes a p-type metal-oxide-semiconductor field-effect transistor (MOSFET). However, the third FET 106 can include other FETs such as a n-type MOSEFT.

The third controller 86 includes a third gate driver 108. The third gate driver 108 is configured to apply the third gate voltage VG3 to the third gate terminal G3. The third gate voltage VG3 applied from the third gate driver 108 is higher than the third threshold voltage.

The third gate driver 108 is configured to receive the first output voltage V1 detected by the first voltage detector VD1 and the second output voltage V2 detected by the second voltage detector VD2. The third gate driver 108 is configured to apply the third gate voltage VG3 to the third gate terminal G3 if the first output voltage V1 is equal to or higher than the first supplying-start threshold TH31 and the second output voltage V2 is equal to or higher than the second supplying-start threshold TH32.

The third controller 86 includes a fourth field-effect transistor (FET) 110. The fourth FET 110 is configured to control the flow of current between a fourth source terminal S4 and a fourth drain terminal N4 in response to a fourth gate voltage VG4 applied to a fourth gate terminal G4. The fourth FET 110 is configured to allow the flow of current between the fourth source terminal S4 and the fourth drain terminal N4 while the fourth gate voltage VG4 applied to the fourth gate terminal G4 is higher than a fourth threshold voltage of the fourth FET 110. The fourth FET 110 is configured to interrupt the flow of current between the fourth source terminal S4 and the fourth drain terminal N4 while the fourth gate voltage VG4 applied to the fourth gate terminal G4 is equal to or lower than the fourth threshold voltage. For example, the fourth FET 110 includes a p-type metal-oxide-semiconductor field-effect transistor (MOSFET). However, the fourth FET 110 can include other FETs such as a n-type MOSEFT.

The third controller 86 includes a fourth gate driver 112. The fourth gate driver 112 is configured to apply the fourth gate voltage VG4 to the fourth gate terminal G4. The fourth gate voltage VG4 applied from the fourth gate driver 112 is higher than the fourth threshold voltage.

The fourth gate driver 112 is configured to receive, from the main controller 75, the operation signal SG indicating at least one of the switches SW1, SW2, and SW3 is operated. The fourth gate driver 112 is configured to apply the fourth gate voltage VG4 to the fourth gate terminal G4 if the fourth gate driver 112 receives the operation signal SG from the main controller 75.

Thus, the third controller 86 is configured to allow the electric supply from the second electric power source 36 to the electric components EC if the first output voltage V1 is equal to or higher than the first supplying-start threshold TH31, the second output voltage V2 is equal to or higher than the second supplying-start threshold TH32, and at least one of the switches SW1, SW2, and SW3 is operated.

The third gate driver 108 is configured to receive the fourth output voltage V4 detected by the fourth voltage detector VD4. The third gate driver 108 is configured to stop applying the third gate voltage VG3 to the third gate terminal G3 if the fourth output voltage V4 is equal to or lower than the first supplying-stop threshold TH33. Thus, the third controller 86 is configured to interrupt the electric supply from the second electric power source 36 to the electric components EC if the above condition is met.

The fourth gate driver 112 is configured to receive the supplying stop command CM3 from the main controller 75. The fourth gate driver 112 is configured to stop applying the fourth gate voltage VG4 to the fourth gate terminal G4 if the fourth gate driver 112 receives the supplying stop command CM3 from the main controller 75. Thus, the third controller 86 is configured to interrupt the electric supply from the second electric power source 36 to the electric components EC if the above condition is met.

The operating device 10 includes a converter 114. The converter 114 is configured to convert an input voltage to a predetermined voltage. The converter 114 is electrically connected to the third controller 86. The converter 114 is configured to convert the fourth output voltage V4 of the third controller 86 to the predetermined voltage. The converter 114 is electrically mounted on the first substrate 40. The converter 114 is electrically connected to the main controller 75, the wireless communicator 60, the antenna 76, and the informing unit 78.

As seen in FIG. 8, the informing unit 78 is configured to inform a user of the information. The informing unit 78 is configured to inform the user of at least one of the first electrical state of the first electric power source 34 and the second electrical state of the second electric power source 36. The informing unit 78 is configured to indicate the information. In the present embodiment, for example, the informing unit 78 includes a light emitting device such as a light-emitting diode (LED).

The main controller 75 is configured to control the informing unit 78 to inform the user of the information based on the information. In the present embodiment, the main controller 75 is configured to control the informing unit 78 to indicate at least one of the first electrical state of the first electric power source 34 and the second electrical state of the second electric power source 36. For example, the main controller 75 is configured to control the informing unit 78 to indicate the second remaining level of the second electric power source 36.

As seen in FIGS. 9 and 10, the main controller 75 is configured to control the informing unit 78 to indicate each of a lower remaining level ("LOW") and a higher remaining level ("HIGH") of the second electric power source 36. The main controller 75 is configured to control the informing unit 78 to maintain the indication of the lower remaining level or the higher remaining level during the charging of the second electric power source 36.

The informing unit 78 is configured to indicate the lower remaining level in a first manner. The informing unit 78 is configured to indicate the higher remaining level in a second manner different from the first manner. For example, the informing unit 78 is configured to indicate the lower remaining level with first fight having a first color. The informing unit 78 is configured to indicate the higher remaining level with second light having a second color. The second color of the second light is different from the first color of the first light. However, the main controller 75 can be configured to control the informing unit 78 to blink for indicating the lower remaining level and configured to control the informing unit 78 to turn on for indicating the higher remaining level. The informing unit 78 can include a lower-level indicator and a higher-level indicator which are separately provided.

The main controller 75 is configured to control the informing unit 78 to indicate the lower remaining level if the informing unit 78 indicates the higher remaining level (first condition CG11), the second output voltage V2 of the second electric power source 36 is lower than a first lower-level threshold TH51 (first condition CG12), the first output voltage V1 is lower than a second lower-level threshold TH52 (first condition CG13), and the second controller 84 has not started to charge the second electric power source 36 (first condition CG14). However, the conditions to indicate the lower remaining level are not limited to the first conditions CG11 to CG14.

The main controller 75 is configured to control the informing unit 78 to indicate the lower remaining level based on other conditions. Specifically, the main controller 75 is configured to control the informing unit 78 to indicate the lower remaining level if the informing unit 78 indicates the higher remaining level (second condition CG21) and the second output voltage V2 of the second electric power source 36 is lower than the first lower-level threshold TH51 when the first controller 82 completes the charging of the second electric power source 36 (second condition CG22). However, the conditions to indicate the lower remaining level are not limited to the second conditions CG21 and CG22.

The main controller 75 is configured to control the informing unit 78 to indicate the lower remaining level based on other conditions. Specifically, the main controller 75 is configured to control the informing unit 78 to indicate the lower remaining level if the informing unit 78 indicates the higher remaining level (third condition CG31), the second output voltage V2 of the second electric power source 36 is lower than a third lower-level threshold TH53 (third condition CG32), and the second controller 84 has not started to charge the second electric power source 36 (third condition CG33). However, the conditions to indicate the lower remaining level are not limited to the third conditions CG31 to CG33.

The main controller 75 is configured to control the informing unit 78 to indicate the higher remaining level if the informing unit 78 indicates the lower remaining level (condition CH1), the second output voltage V2 of the second electric power source 36 is higher than a first higher-level threshold TH61 (condition CH2), the first output voltage V1 is higher than a second higher-level threshold TH62 (condition CH3), or the difference between a latest value of the first output voltage V1 and a previous value of the first output voltage V1 is larger than a third higher-level threshold TH63 when the first controller 82 and the second controller 84 do not charge the second electric power source 36 (condition CH4). For example, at least one of the conditions CH1 to CH4 is med when the first electric power source 34 is replaced with a new electric power source. However, the conditions to indicate the higher remaining level are not limited to the conditions CH1 to CH4.

Figure 11:
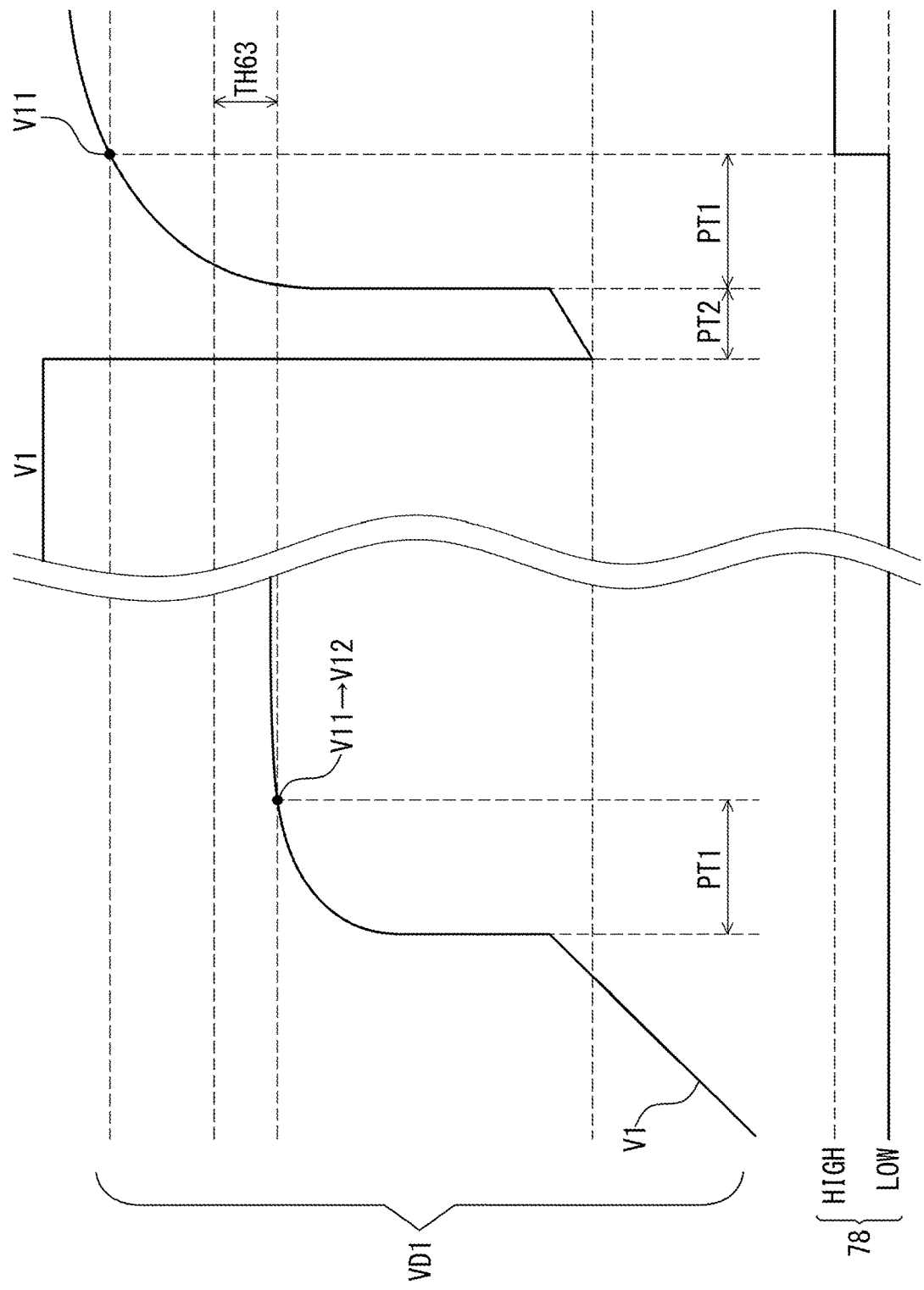
FIG. 11 is a timing chart showing the control of the operating device illustrated in FIG. 1.

As seen in FIG. 11, the main controller 75 is configured to store the latest first output voltage V11 and the previous first output voltage V12. The previous first output voltage V12 is detected by the first voltage detector VD1 before the latest first output voltage V11 is detected. The latest first output voltage V11 is detected by the first voltage detector VD1 next to the previous first output voltage V12. When the first voltage detector VD1 detects the first output voltage V1, the main controller 75 stores the latest first output voltage V11 as the previous first output voltage V12 and stores the first output voltage V1 as the latest first output voltage V11.

In the present embodiment, the main controller 75 is configured to store the latest first output voltage V11 detected by the first output voltage V1 when a first predetermined time PT1 (e.g., two seconds) lapses after the charging of the second electric power source 36 is completed. The main controller 75 is configured to control the second controller 84 to temporarily charge the second electric power source 36 for a second predetermined time PT2 (e.g., one second) when the controller 63 is turned on. The main controller 75 is configured to store the latest first output voltage V11 detected by the first output voltage V1 when the first predetermined time PT1 (e.g., two seconds) lapses after the temporarily charging of the second electric power source 36 is completed.

The main controller 75 is configured to subtract the previous first output voltage V12 from the latest first output voltage V11 to obtain the difference between the latest first output voltage V11 and the previous first output voltage V12. The main controller 75 is configured to control the informing unit 78 to indicate the higher remaining level if the difference is larger than the third higher-level threshold TH63 when the informing unit 78 indicates the lower remaining level.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the tem' "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
   a base member;
   an operating member movably coupled to the base member;
   an accommodating structure configured to accommodate a first electric power source; and
   a second electric power source electrically connected so as to supply electricity to a wireless communicator, the second electric power source being separate from the first electric power source, wherein
   the first electric power source and the second electric power source each include a battery, and
   the first electric power source and the second electric power source are each provided at different planes in the base member.

2. The operating device according to claim 1, wherein
   the accommodating structure includes an electrical contact configured to be in contact with the first electric power source in an accommodation state where the accommodating structure accommodates the first electric power source, and
   the second electric power source is configured to be electrically connected to the electrical contact.

3. The operating device according to claim 2, wherein
   the electrical contact is configured to connect the first electric power source and the second electric power source in parallel.

4. The operating device according to claim 2, wherein
   the electrical contact includes a positive contact, and a negative contact separated from the positive contact, and
   the second electric power source is configured to be electrically connected to the positive contact and the negative contact.

5. The operating device according to claim 1, wherein
   the first electric power source includes a primary battery, and
   the second electric power source includes a secondary battery.

6. The operating device according to claim 1, further comprising
   a first substrate extending along a first reference plane, wherein
   the second electric power source is electrically connected to the first substrate.

7. The operating device according to claim 6, wherein
   the second electric power source is electrically mounted on the first substrate.

8. The operating device according to claim 6, wherein
   the first substrate is provided between the first electric power source accommodated in the accommodating structure and the second electric power source.

9. The operating device according to claim 1, wherein
   the first electric power source and the second electric power source longitudinally extend along non-parallel planes in the base member.

10. The operating device according to claim 1, wherein
    the base member extends in a longitudinal direction and includes
    a first end portion configured to be coupled to a handlebar, and
    a second end portion opposite to the first end portion in the longitudinal direction, and at least one of the accommodating structure and the second electric power source is provided to the second end portion.

11. The operating device according to claim 1, further comprising
a controller configured control an electric supply from at least one of the first electric power source and the second electric power source based on an information relating to at least one of the first electric power source and the second electric power source.

12. The operating device according to claim 11, wherein the information includes
a first electrical state of the first electric power source, and
a second electrical state of the second electric power source, and
the controller is configured to control the electric supply from at least one of the first electric power source and the second electric power source based on at least one of the first electrical state and the second electrical state.

13. The operating device according to claim 12, wherein the controller is configured to start to charge the second electric power source using electricity stored in the first electric power source if the first electrical state meets a first charging-start condition and/or if the second electrical state meets a second charging-start condition.

14. The operating device according to claim 12, wherein the controller is configured to stop charging the second electric power source if the first electrical state meets a first charging-stop condition and/or if the second electrical state meets a second charging-stop condition.

15. The operating device according to claim 12, wherein the controller is configured to start to supply electricity from the second electric power source to an electric component if the first electrical state meets a first supplying-start condition and/or if the second electrical state meets a second supplying-start condition.

16. The operating device according to claim 12, wherein the controller is configured to stop supplying electricity from the second electric power source to the electric component if the first electrical state meets a first supplying-stop condition and/or if the second electrical state meets a second supplying-stop condition.

17. The operating device according to claim 12, wherein the first electrical state includes at least one of a first output voltage of the first electric power source, a first output current of the first electric power source, and a first remaining level of the first electric power source, and
the second electrical state includes at least one of a second output voltage of the second electric power source, a second output current of the second electric power source, and a second remaining level of the second electric power source.

18. The operating device according to claim 11, further comprising
a detector configured to detect the information.

19. The operating device according to claim 18, wherein the controller includes a memory connected to the detector so as to store the information detected by the detector.

20. The operating device according to claim 11, further comprising
an informing unit configured to inform a user of the information.

21. An operating device for a human-powered vehicle, comprising:
a base member;
an operating member movably coupled to the base member;
an accommodating structure configured to accommodate a first electric power source;
a second electric power source electrically connected so as to supply electricity to a wireless communicator, the second electric power source being separate from the first electric power source; and
a first substrate extending along a first reference plane, wherein
the second electric power source is electrically connected to the first substrate,
the first reference plane defines a first area and a second area provided on a reverse side of the first area with respect to the first reference plane,
the accommodating structure is provided in one of the first area and the second area, and
the second electric power source is provided in the other of the first area and the second area.

22. An operating device for a human-powered vehicle, comprising:
a base member;
an operating member movably coupled to the base member;
an accommodating structure configured to accommodate a first electric power source; and
a second electric power source electrically connected so as to supply electricity to a wireless communicator, the second electric power source being separate from the first electric power source, wherein
the first electric power source is not rechargeable,
the second electric power source is rechargeable, and
the first electric power source and the second electric power source are each provided at different planes in the base member.

23. The operating device according to claim 22, wherein the first electric power source is a battery, and
the second electric power source is a battery or a capacitor.

24. The operating device according to claim 22, wherein the first electric power source and the second electric power source longitudinally extend along non-parallel planes in the base member.

* * * * *